(12) United States Patent
Ohmori et al.

(10) Patent No.: US 10,181,605 B2
(45) Date of Patent: Jan. 15, 2019

(54) JOINING MATERIAL AND STACK STRUCTURE OF FUEL CELL USING THE JOINING MATERIAL

(71) Applicant: NGK Insulators, Ltd., Nagoya (JP)

(72) Inventors: Makoto Ohmori, Nagoya (JP); Tomohiro Usui, Hashima-Gun (JP); Koichi Koga, Nagoya (JP); Masayuki Shinkai, Ama-Gun (JP); Genta Terazawa, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 1513 days.

(21) Appl. No.: 13/903,240

(22) Filed: May 28, 2013

(65) Prior Publication Data

US 2014/0004439 A1  Jan. 2, 2014

Related U.S. Application Data

(60) Provisional application No. 61/666,042, filed on Jun. 29, 2012.

(30) Foreign Application Priority Data

Jun. 28, 2012 (JP) ................................ 2012-145274
Oct. 12, 2012 (JP) ................................ 2012-226638

(51) Int. Cl.
| | |
|---|---|
| *H01M 8/02* | (2016.01) |
| *C03C 8/00* | (2006.01) |
| *H01M 8/0282* | (2016.01) |
| *C03C 8/24* | (2006.01) |
| *C03C 10/00* | (2006.01) |
| *H01M 8/124* | (2016.01) |

(52) U.S. Cl.
CPC ............. *H01M 8/0282* (2013.01); *C03C 8/00* (2013.01); *C03C 8/24* (2013.01); *C03C 10/0045* (2013.01); *H01M 2008/1293* (2013.01)

(58) Field of Classification Search
None
See application file for complete search history.

(56) References Cited

U.S. PATENT DOCUMENTS 6,235,668 B1 * 5/2001 Chatterjee ............... C04B 35/20
117/942

FOREIGN PATENT DOCUMENTS

| JP | 2005-100687 A1 | | 4/2005 |
|---|---|---|---|
| JP | 2010108698 | * | 5/2010 |

* cited by examiner

*Primary Examiner* — Ladam Mohaddes
(74) *Attorney, Agent, or Firm* — Burr & Brown, PLLC

(57) ABSTRACT

A plurality of insertion holes for inserting one end of each of a plurality of cells is formed on the surface of a support substrate. One end of each of the cells is loosely fitted in the corresponding insertion hole. A joining material is provided so as to fill at least a gap present between the inner wall of the insertion hole and the outer wall of the one end of the cell in each joining portion between each of the insertion holes and one end of the corresponding cell. As the joining material, crystallized glass which includes a plurality of kinds of crystal phases generated when the crystallization of amorphous glass heated up to a crystallization temperature proceeds is used, and a volume reduction ratio (crystallization shrinkage ratio) of the joining material caused by the crystallization at the crystallization temperature is 0.78% or more and 12% or less.

10 Claims, 35 Drawing Sheets

JOINING MATERIAL AND STACK STRUCTURE OF FUEL CELL USING THE JOINING MATERIAL

BACKGROUND OF THE INVENTION

1. Field of the Invention

The present invention relates to a joining material and a stack structure of a fuel cell using the joining material.

2. Description of the Related Art

Hitherto, there has been known a stack structure of a solid oxide fuel cell including "a plurality of cells each having a longitudinal direction and including a support substrate having a gas flow path formed therein," "a support plate for joining and supporting one end of each cell in the longitudinal direction through use of a joining material so that the cells protrude respectively from a surface of the support plate in the longitudinal direction and the plurality of cells are arranged in a stack shape," and "a gas manifold on which the support plate is provided so that an inner space of the manifold and one end of each gas flow path of each of the plurality of cells communicate with each other" (see, for example, Japanese Patent Application Laid-open No. 2005-100687).

SUMMARY OF THE INVENTION

Regarding the above-mentioned stack structure, the inventor of the present invention considers a stack structure having the following features. At least one insertion hole for communicating with the inner space of the manifold and inserting one end of each of the plurality of cells is formed on the surface of the support plate. One end of each cell is loosely fitted in the corresponding insertion hole. The joining material is provided so as to enter (fill) at least a gap present between an inner wall of the insertion hole and an outer wall of one end of the cell in a joining portion between each insertion hole and one end of the corresponding cell, with the result that each insertion hole and one end of the corresponding cell are joined to each other.

The inventor of the present invention considers the use of crystallized glass, instead of amorphous glass, as a joining material with respect to the stack structure having the above-mentioned features, from the viewpoint of enhancing durability and the like. In the case where amorphous glass is used, an air electrode and a fuel electrode provided in a cell may be poisoned due to the volatilization of elements of materials forming the amorphous glass at working temperature of a fuel cell. As a result, there is a risk in that the performance (characteristics) of the electrodes may be degraded, and the durability of the fuel cell may decrease. Note that, the crystallized glass can also be defined as glass having a crystallinity degree of 60% or more obtained by subjecting an amorphous material (amorphous glass) to heat treatment (crystallization) to crystallize (solidify, form into ceramics) the amorphous material.

In the case where the crystallized glass is used as the joining material, first, a gap of each joining portion is filled with paste of an amorphous material (amorphous glass). The amorphous material is subjected to heat treatment in this state to be crystallized (to become crystallized glass). Thus, one end of each cell is joined to the corresponding insertion hole to complete a stack structure.

After the heat treatment, cracks are generated from the surface to the inside of the joining material formed of the crystallized glass in some cases (see FIG. 8 described later). The inventor of the present invention conducted various experiments so as to overcome the problem. As a result, the inventor of the present invention found that there is a strong correlation between the generation of cracks and "a volume reduction ratio of the joining material caused by the crystallization" (hereinafter referred to as "crystallization shrinkage ratio") in a process in which the crystallization of the amorphous material proceeds at the crystallization temperature.

It is an object of the present invention to provide a joining material formed of crystallized glass, in which cracks are not generated easily, when applied to a stack structure of a fuel cell having the above-mentioned features, and to provide a stack structure of a fuel cell using the joining material.

According to an exemplary embodiment of the present invention, there is provided a joining material formed of crystallized glass having a crystallinity degree of 60% or more and including a plurality of kinds of crystal phases, the crystallized glass being generated when crystallization of amorphous glass heated up to a crystallized temperature by heat treatment proceeds. It is preferred that the crystallized glass be formed of a $SiO_2$—MgO based material. The feature of the joining material resides in that the "crystallization shrinkage ratio" is 0.78% or more and 12% or less.

The inventor of the present invention found that, when the joining material formed of the crystallized glass is used in the stack structure of the fuel cell having the above-mentioned features, cracks are not generated easily in the joining material (crystallized glass) in the case where the "crystallization shrinkage ratio" is 0.78% or more and 12% or less, compared to the case where the "crystallization shrinkage ratio" is not in this range. This point is described later in detail.

DETAILED DESCRIPTION OF THE PREFERRED EMBODIMENTS (Example of Configuration of Cell Used in Stack Structure)

Figure 1:
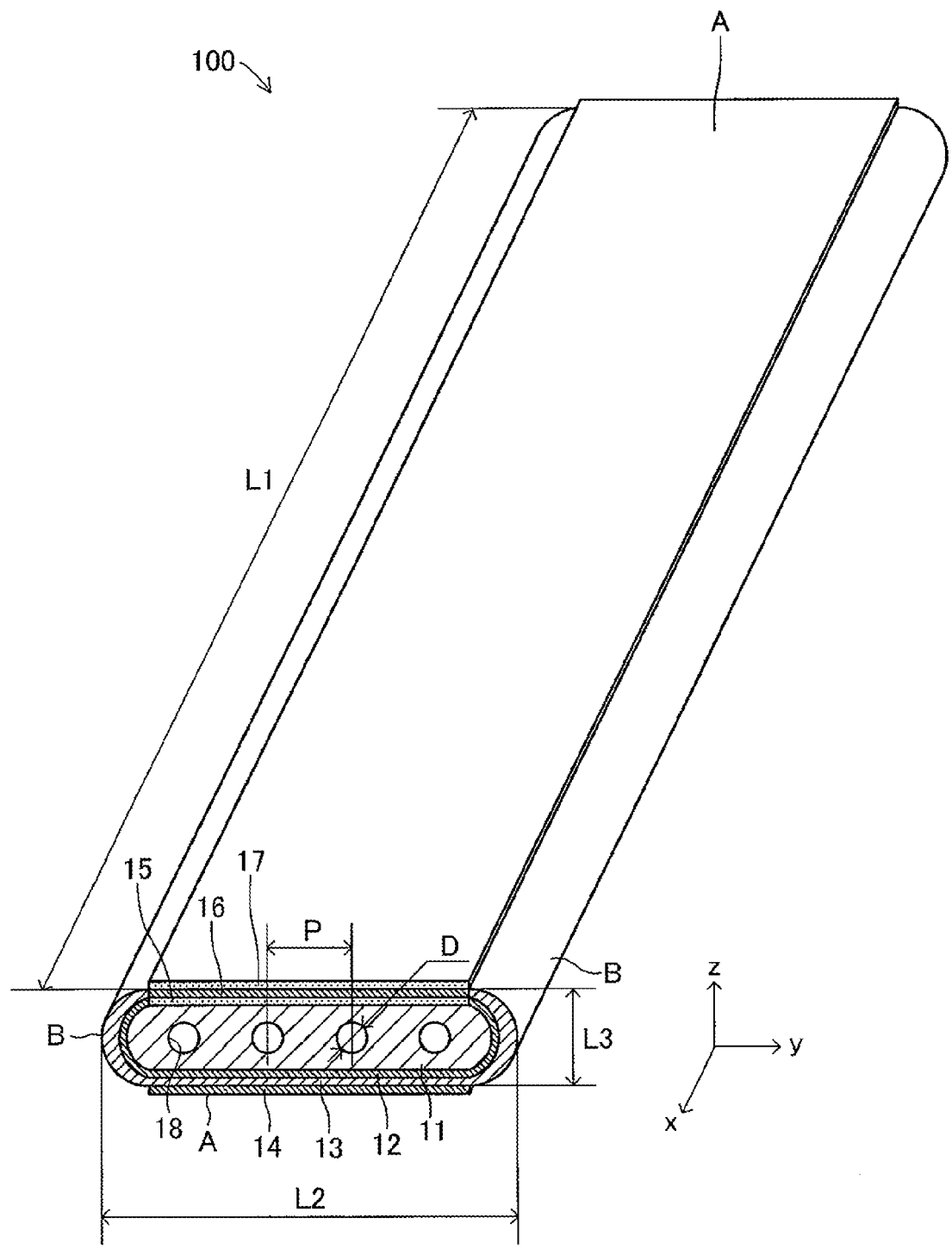
FIG. 1 is a perspective view illustrating one cell to be used in a stack structure of a fuel cell according to an embodiment of the present invention.

First, a cell 100 to be used in a stack structure of a solid oxide fuel cell (SOFC) according to an embodiment of the present invention is described. As illustrated in FIG. 1, in the cell 100, a porous fuel electrode 12, a dense solid electrolyte 13, and an air electrode 14 made of porous conductive ceramics are laminated successively on one principal surface of a porous plate-like conductive support 11. Further, an intermediate film 15, an interconnector 16 made of a lanthanum-chromium based oxide material, and a current-collecting film 17 made of a P-type semiconductor material are formed successively on a principal surface of the conductive support 11 on a side opposite to the air electrode 14.

The cell 100 has a plate shape having a first longitudinal direction (x-axis direction). A length L1 (length in the first longitudinal direction) of the cell 100 is 50 mm to 500 mm, a width L2 thereof is 10 mm to 100 mm, and a thickness L3 thereof is 1 mm to 5 mm (L1>L2). A shape (oval shape having a length L2 and a width L3, L2>L3) of a side surface of one end in the first longitudinal direction (x-axis direction) of the cell 100 has a second longitudinal direction (y-axis direction).

Further, in the conductive support 11, a plurality of gas flow paths (through-holes) 18 parallel to each other are formed along the longitudinal direction (x-axis direction) at intervals in the width direction (y-direction). A sectional shape of each gas flow path 18 is a circle having a diameter D of 0.5 mm to 3 mm. An interval (pitch) P in the width direction between the adjacent gas flow paths 18, 18 is 1 mm to 5 mm. Note that, the sectional shape of each gas flow path 18 may be an oval, an elongated hole, or a rectangle having arcs at respective four corners.

The cell 100 includes side end portions B, B respectively provided on both sides in the width direction (direction orthogonal to the longitudinal direction), and a pair of flat portions A, A connecting the side end portions B, B. The pair of flat portions A, A is flat and substantially parallel to each other. On one of the flat portions A, A, the fuel electrode 12, the solid electrolyte 13, and the air electrode 14 are formed successively on one principal surface of the conductive support 11, and on the other of the flat portions A, A, the intermediate film 15, the interconnector 16, and the current-collecting film 17 are formed successively on the other principal surface of the conductive support 11.

It is desired that a width of the conductive support 11 be 10 mm to 100 mm, and a thickness thereof be 1 mm to 5 mm. An aspect ratio (width/thickness) of the conductive support 11 is 5 to 100. Note that, although the shape of the conductive support 11 is expressed as a "thin-plate like" shape, the shape of the conductive support 11 can also be expressed as a "cylindroid" shape or a "flat" shape in accordance with a combination of the dimension in the width direction and the dimension in the thickness direction.

It is desired that the conductive support 11 be formed of a material containing an oxide of at least one kind of rare earth element selected from the group consisting of Y, Lu, Yb, Tm, Er, Ho, Dy, Gd, Sm, and Pr, and Ni and/or NiO as main components. The conductive support 11 may contain Fe and Cu in addition to Ni.

Alternatively, it is also possible to describe that the conductive support 11 contains "a nickel oxide (NiO) or nickel (Ni)" and "an insulating ceramics." As the insulating ceramics, there may be used, for example, calcia-stabilized zirconia (CSZ), yttria-stabilized zirconia (YSZ) (8YSZ), yttria ($Y_2O_3$), magnesium oxide (MgO), or "a mixture of magnesia-alumina spinel ($MgAl_2O_4$) and magnesium oxide (MgO)." The conductivity of the conductive support 11 at 800° C. is 10 S/cm to 2,000 S/cm. The porosity of the conductive support 11 is 20% to 60%.

The intermediate film 15 formed between the conductive support 11 and the interconnector 16 can be formed of a material containing as main components Ni and/or NiO and $ZrO_2$ containing a rare earth element, or a rare earth oxide (for example, $Y_2O_3$). An amount of the Ni compound in terms of Ni in the intermediate film 15 is desirably 35% by volume to 80% by volume, more desirably 50% by volume to 70% by volume with respect to the entire amount. When the amount in terms of Ni is 35% by volume or more, the number of conductive paths created by Ni increases to enhance a degree of conductivity of the intermediate film 15. As a result, a voltage drop attributed to the intermediate film 15 decreases. Further, when the amount in terms of Ni is 80% by volume or less, a thermal expansion coefficient difference between the conductive support 11 and the interconnector 16 can be decreased, and the generation of cracks at an interface between the conductive support 11 and the interconnector 16 can be suppressed.

Further, from the viewpoint of decreasing a voltage drop, the thickness of the intermediate film 15 is desirably 20 μm or less, more desirably 10 μm or less.

A thermal expansion coefficient of an oxide of a medium rare earth element or a heavy rare earth element is smaller than a thermal expansion coefficient of "$ZrO_2$ containing $Y_2O_3$" in the solid electrolyte 13. Thus, a thermal expansion coefficient of the conductive support 11 as a cermet material with Ni can be brought close to the thermal expansion coefficient of the solid electrolyte 13. As a result, cracks in the solid electrolyte 13 and peeling of the solid electrolyte 13 from the fuel electrode 12 can be suppressed. Further, by using a heavy rare earth element oxide having a small thermal expansion coefficient, the amount of Ni in the conductive support 11 can be increased, and the degree of electrical conductivity of the conductive support 11 can be enhanced. From this viewpoint, it is desired to use the heavy rare earth element oxide.

Note that, as long as the total thermal expansion coefficients of the rare earth element oxides is less than the thermal expansion coefficient of the solid electrolyte 13, there is no problem even when an oxide of a light rare earth element such as La, Ce, Pr, or Nd may be contained in the rare earth elements in addition to the medium rare earth element and the heavy rare earth element.

Further, a material cost can be significantly lowered through use of a composite rare earth element oxide containing a plurality of inexpensive rare earth elements that are in the middle of purification. Also in this case, it is desired that a thermal expansion coefficient of the composite rare earth element oxide be less than the thermal expansion coefficient of the solid electrolyte 13.

Further, it is desired that the current-collecting film 17 made of a P-type semiconductor, for example, a transition metal perovskite oxide be provided on the surface of the interconnector 16. When a current-collecting member made of metal is directly formed on the surface of the interconnector 16 to collect electricity, a potential drop becomes large due to non-ohmic contact. In order to ensure ohmic contact to decrease the potential drop, it is necessary to connect the current-collecting film 17 made of a P-type semiconductor to the interconnector 16. As the P-type semiconductor, it is desired to use a transition metal perovskite oxide. As the transition metal perovskite oxide, it is desired to use at least one kind of a lanthanum-manganese oxide, a lanthanum-iron oxide, a lanthanum-cobalt oxide, and a composite oxide thereof.

The fuel electrode 12 provided on the principal surface of the conductive support 11 is formed of Ni and $ZrO_2$ in which a rare earth element is dissolved. It is desired that the thickness of the fuel electrode 12 be 1 μm to 30 μm. When the thickness of the fuel electrode 12 is 1 μm or more, a three-layer interface as the fuel electrode 12 is formed sufficiently. Further, when the thickness of the fuel electrode 12 is 30 μm or less, interface peeling caused by a thermal expansion difference between the fuel electrode 12 and the solid electrolyte 13 can be prevented.

The solid electrolyte 13 provided on the principal surface of the fuel electrode 12 is formed of yttria-stabilized zirconia (YSZ) (dense ceramics) containing yttria ($Y_2O_3$). It is desired that the thickness of the solid electrolyte 13 be 0.5 μm to 100 μm. When the thickness of the solid electrolyte 13 is 0.5 μm or more, gas permeation can be prevented. Further, when the thickness of the solid electrolyte 13 is 100 μm or less, an increase of a resistant component can be suppressed.

Further, the air electrode 14 is formed of a porous conductive ceramics including at least one kind of a lanthanum-manganese oxide, a lanthanum-iron oxide, a lanthanum-cobalt oxide, and a composite oxide thereof as a transition metal perovskite oxide. The air electrode 14 is desirably a (La, Sr)(Fe, Co)$O_3$-based electrode from the viewpoint of high electrical conductivity in a medium temperature range of about 800° C. The thickness of the air electrode 14 is desirably 10 μm to 100 μm from the viewpoint of a current collection property.

The interconnector 16 is formed as a dense body so as to prevent leakage of a fuel gas and an oxygen-containing gas inside and outside of the conductive support 11. Further, the inner and outer surfaces of the interconnector 16 come into contact with the fuel gas and the oxygen-containing gas, and hence have reduction resistance and oxidation resistance, respectively.

It is desired that the thickness of the interconnector 16 be 30 μm to 200 μm. When the thickness of the interconnector 16 is 30 μm or more, gas permeation can be prevented completely, and when the thickness of the interconnector 16 is 200 μm or less, an increase of a resistant component can be suppressed.

A joining layer made of, for example, Ni and $ZrO_2$ or $Y_2O_3$ may be interposed between an end portion of the interconnector 16 and an end portion of the solid electrolyte 13 so as to enhance a sealing property.

In the cell 100, the dense solid electrolyte 13 is formed not only on one principal surface of the conductive support 11 but also on side end surfaces of the interconnector 16 on the other principal surface through side end portions of the conductive support 11. That is, the solid electrolyte 13 extends to the other principal surface of the conductive support 11 so as to form side end portions B, B on both sides to be joined with the interconnector 16. It is desired that the side end portions B, B (side end portions of the conductive support 11) have a curved shape protruding outward in the width direction so as to alleviate thermal stress generated by heating or cooling involved in power generation.

Next, a production method for the above-mentioned cell 100 is described. First, rare earth element oxide powder excluding elements such as La, Ce, Pr, and Nd and Ni and/or NiO powder are mixed. A conductive support material obtained by mixing an organic binder and a solvent with the mixed powder is extruded and molded to produce a plate-like conductive support compact. The compact is dried and defatted.

Further, a sheet-like solid electrolyte compact is produced through use of a solid electrolyte material obtained by mixing $ZrO_2$ powder in which a rare earth element (Y) is dissolved, an organic binder, and a solvent.

Next, slurry which becomes the fuel electrode 12 and is produced by mixing Ni and/or NiO powder, $ZrO_2$ powder in which a rare earth element is dissolved, an organic binder, and a solvent is applied to one side of the solid electrolyte compact. Consequently, a fuel electrode compact is formed on one surface of the solid electrolyte compact.

Next, a laminate of the sheet-like solid electrolyte compact and the fuel electrode compact is wrapped around the conductive support compact so that the fuel electrode compact comes into abutment on the conductive support compact.

Next, the sheet-like solid electrolyte compact is further laminated in a plurality of layers on the solid electrolyte compact at positions forming the side end portions B, B of the laminated compact and then dried. Further, the slurry which becomes the solid electrolyte 13 may be screen-printed onto the solid electrolyte compact. At this time, defatting may be performed.

Next, a sheet-like interconnector compact is produced through use of an interconnector material obtained by mixing lanthanum-chromium oxide powder, an organic binder, and a solvent.

A sheet-like intermediate film compact is produced through use of slurry obtained by mixing Ni and/or NiO powder, $ZrO_2$ powder in which a rare earth element is dissolved, an organic binder, and a solvent.

Next, the interconnector compact and the intermediate film compact are laminated. The laminate is laminated on the conductive support compact so that the intermediate film compact side of the laminate comes into abutment on the exposed conductive support compact side.

Thus, a laminated compact is produced, in which the fuel electrode compact and the solid electrolyte compact are laminated successively on one principal surface of the conductive support compact, and the intermediate film compact and the interconnector compact are laminated on the other principal surface. Each compact can be produced by sheet forming using a doctor blade, printing, slurry dipping, or spraying. Each compact can also be produced by a combination thereof.

Next, the laminated compact is defatted and co-fired in an oxygen-containing atmosphere at 1,300° C. to 1,600° C.

Next, transition metal perovskite oxide powder which is a P-type semiconductor and a solvent are mixed to produce a paste. The laminate is soaked in the paste. Then, an air electrode compact and a current-collecting film compact are respectively formed on surfaces of the solid electrolyte 13 and the interconnector 16 by dipping or direct spraying. The compacts are burned at 1,000° C. to 1,300° C. to produce the cell 100.

At this time, due to the firing in the oxygen-containing atmosphere, Ni components in the conductive support 11, the fuel electrode 12, and the intermediate film 15 become MO. Thus, in order to acquire conductivity thereof, a reducing fuel gas is caused to flow from the conductive support 11 side so that NiO is reduced at 800° C. to 1,000° C. for 1 to 10 hours. The reducing treatment may be performed during power generation.

(Example of Entire Configuration of Stack Structure)

Figure 2:
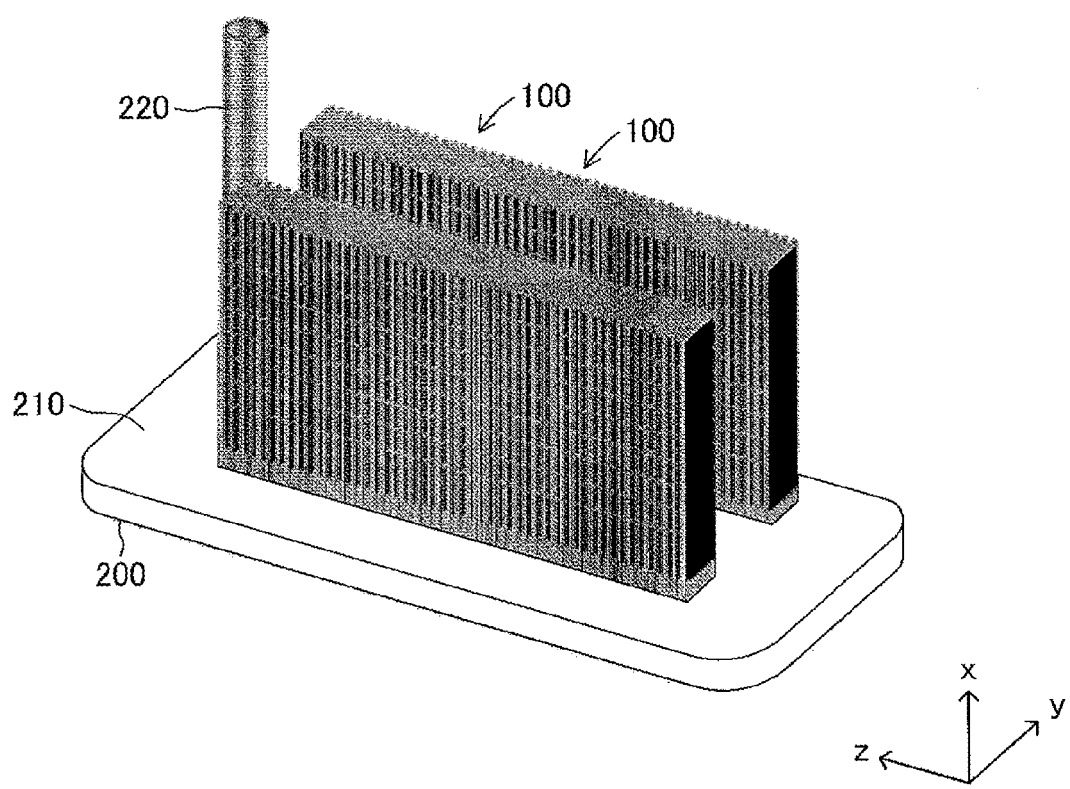
FIG. 2 is a perspective view of the entire stack structure of the fuel cell according to the embodiment of the present invention.

Next, the stack structure of the solid oxide fuel cell (SOFC) according to the embodiment of the present invention using the cell 100 is described. As illustrated in FIG. 2, the stack structure includes a large number of cells 100 and a fuel gas manifold 200 for supplying a fuel gas to each of the large number of cells 100. The entire manifold 200 is formed of a material such as stainless steel.

A top board (in other words, a top board (plate) of a gas tank) of the manifold 200 also serves as a support plate 210 for supporting the large number of cells 100. Further, the manifold 200 includes an introducing path 220 for introducing a fuel gas into an inner space of the manifold 200 from outside. One end of each cell 100 in the first longitudinal direction is joined to and supported by the support plate 210 (joining structure is described later in detail) so that each cell 100 protrudes from the surface of the support plate 210 in the first longitudinal direction (x-axis direction) and the plurality of cells 100 are arranged in a stack shape. The other end of each cell 100 in the first longitudinal direction serves as a free end. Thus, the stack structure can be expressed as a "cantilever stack structure."

Figure 3:
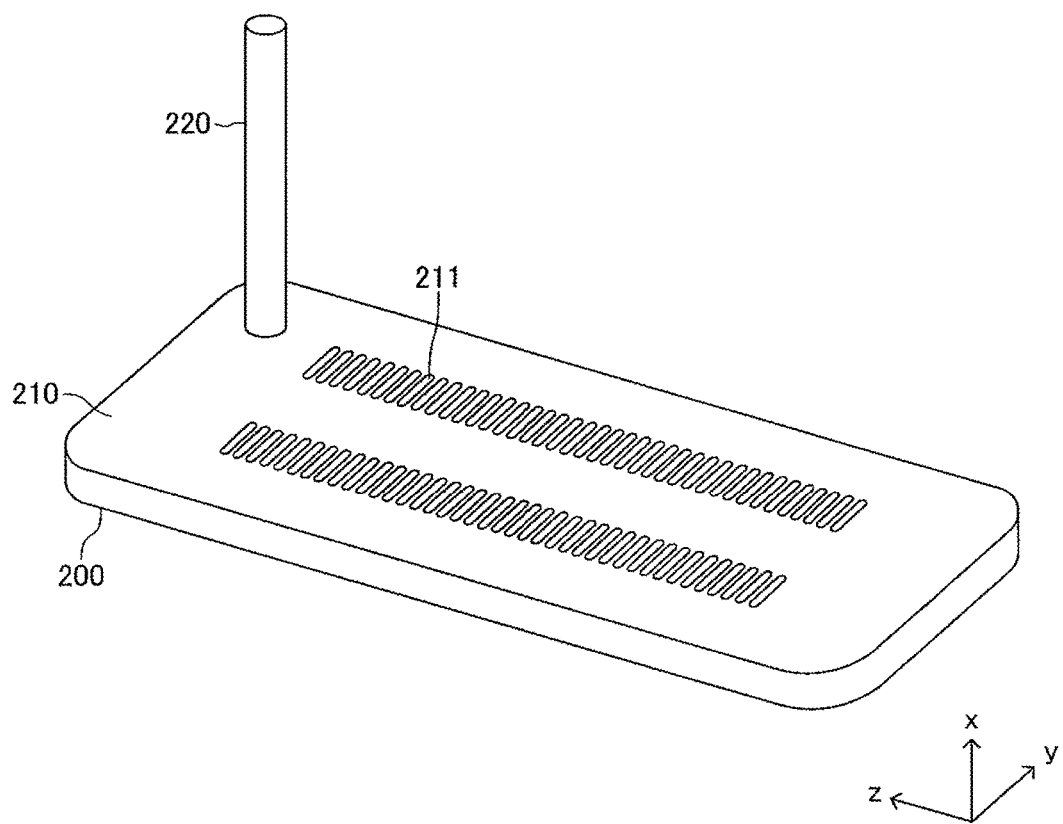
FIG. 3 is a perspective view of an entire fuel gas manifold illustrated in FIG. 2.
Figure 4:
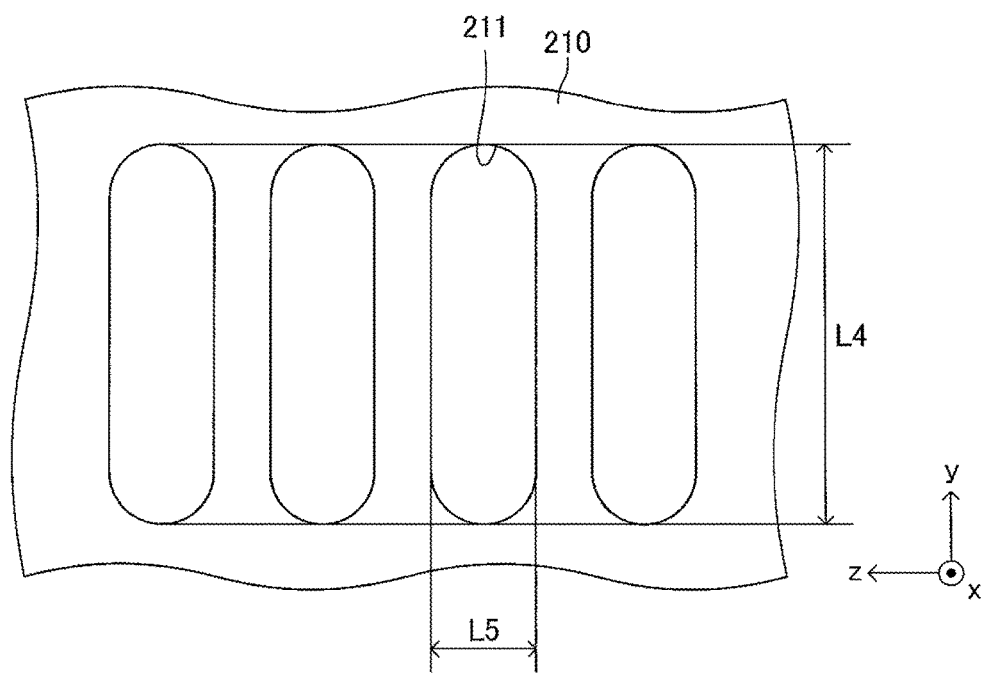
FIG. 4 is an enlarged view of insertion holes formed in a support plate illustrated in FIG. 3.

As illustrated in FIG. 3, a large number of insertion holes 211 communicating with the inner space of the manifold 200 are formed on the surface of the support plate 210 (top board of the manifold 200). One end of the corresponding cell 100 is inserted in each insertion hole 211. As illustrated in FIG. 4, the shape of each insertion hole 211 is an oval shape having a length L4 and a width L5 (L4>L5) and has a direction of a symmetrical axis regarding line symmetry (third longitudinal direction, y-axis direction).

Figure 5:
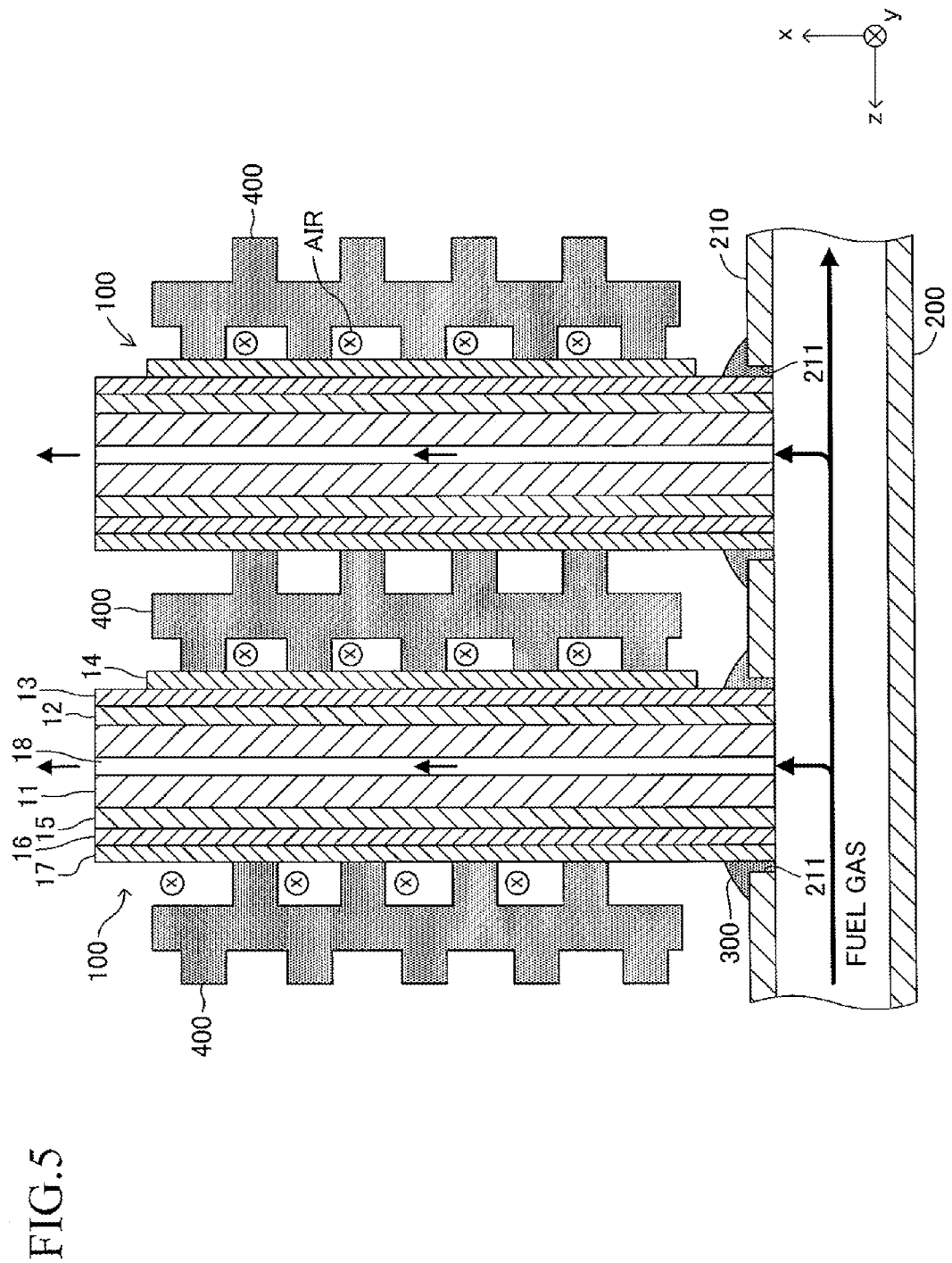
FIG. 5 is a vertical sectional view illustrating a state of a joining portion between each insertion hole and one end of each cell.
Figure 6:
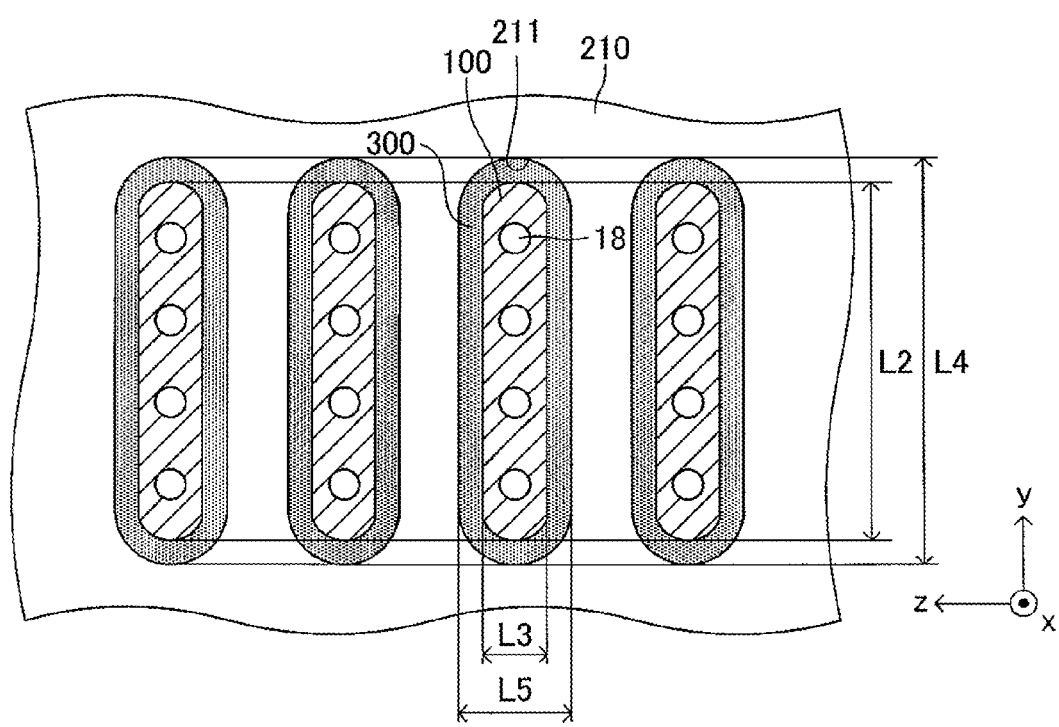
FIG. 6 is a horizontal sectional view illustrating the state of the joining portion between each insertion hole and one end of each cell.

The length L4 of the insertion hole 211 is larger by 0.2 mm to 3 mm than the length L2 (see FIG. 1) of the side surface of one end of the cell 100. Similarly, the width L5 of the insertion hole 211 is larger by 0.2 mm to 3 mm than the width L3 (see FIG. 1) of the side surface of one end of the cell 100. That is, when one end of the cell 100 is inserted in the insertion hole 211 so that the second longitudinal direction (length direction of the side surface of one end of the cell 100) is directed along the direction of the symmetrical axis of the insertion hole 211 (length direction of the insertion hole 211) as illustrated in FIGS. 5 and 6, a gap is formed between an inner wall of the insertion hole 211 and an outer wall of one end of the cell 100. In other words, one end of the cell 100 is loosely fitted in the insertion hole 211. In FIGS. 5 and 6 (in particular, FIG. 6), the gap is illustrated with exaggeration.

As illustrated in FIGS. 5 and 6, a solidified joining material 300 is provided so as to fill the gap in each joining portion between the insertion hole 211 and one end of the cell 100. This allows each insertion hole 211 and one end of the corresponding cell 100 to be joined and fixed to each other. As illustrated in FIG. 5, one end of the gas flow path 18 of each cell 100 communicates with the inner space of the manifold 200.

Further, as illustrated in FIG. 5, a current-collecting member 400 for electrically connecting adjacent cells 100, 100 in series (more specifically, connecting the fuel electrode 12 of one cell 100 to the air electrode 14 of the other cell 100) is interposed between the adjacent cells 100, 100. The current-collecting member 400 is formed of, for example, a metal mesh.

The joining material 300 is formed of crystallized glass. As the crystallized glass, for example, $SiO_2$—$B_2O_3$ based glass, $SiO_2$—CaO based glass, or MgO—$B_2O_3$ based glass can be adopted, and the $SiO_2$—MgO based glass is most preferred. As used herein, the crystallized glass refers to glass (ceramics) in which a ratio of a "volume occupied by a crystal phase" to the entire volume (crystallinity degree) is 60% or more, and a ratio of a "volume occupied by an amorphous phase and impurities" to the entire volume is less than 40%. Specifically, the crystallinity degree of the crystallized glass can be obtained, for example, by "identifying a crystal phase through use of an XRD or the like, observing the structure and composition distribution of the crystallized glass through use of an SEM and an EDS or an SEM and an EPMA, and calculating a volume ratio of a crystal phase region based on the observation result."

The "first longitudinal direction," the "second longitudinal direction," and the "direction of the symmetrical axis" of the insertion hole 211 are hereinafter additionally described. The "first longitudinal direction" refers to a direction of a symmetrical axis regarding the line symmetry in the case where a graphics having a planar (upper surface) shape of the plate-like cell 100 (two-dimensional shape of the cell in top view) has line symmetry and in the case where there are a plurality of symmetrical axes, refers to a direction of a symmetrical axis having the longest length of a portion included in the graphics. Similarly, the "second longitudinal direction" refers to a direction of a symmetrical axis regarding the line symmetry in the case where a graphics having a shape of the side surface of one end of the cell 100 (two-dimensional shape of the cell in side view) has line symmetry, and in the case where there are a plurality of symmetrical axes, refers to a direction of a symmetrical axis having the longest length of a portion included in the graphics. The "direction of the symmetrical axis" of the insertion hole 211 refers to a direction of a symmetrical axis regarding the line symmetry in the case where a graphics having a shape of an insertion hole (two-dimensional shape of the support plate in plan view) has line symmetry, and in the case where there are a plurality of symmetrical axes, refers to any one of the directions of the symmetrical axes.

Figure 7:
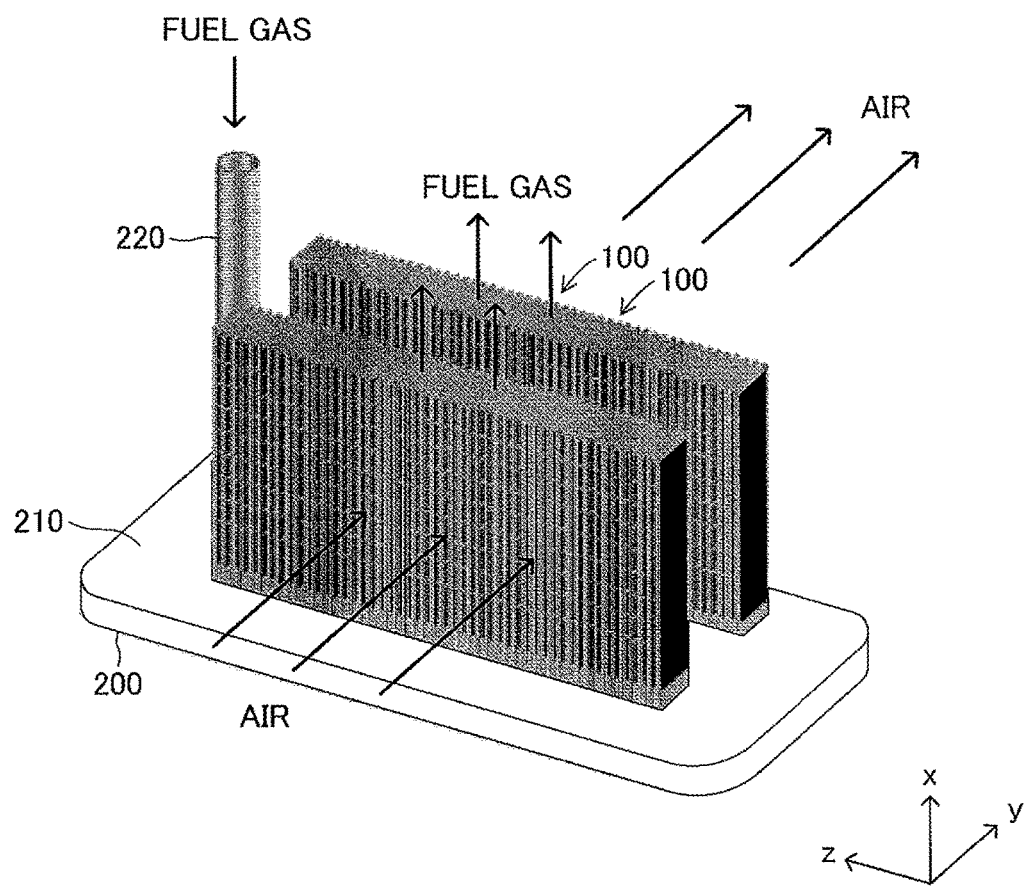
FIG. 7 is a view illustrating a state in which a fuel gas and air are supplied and discharged with respect to the stack structure illustrated in FIG. 2.

When the cantilever stack structure of the fuel cell described above is operated, a fuel gas (hydrogen, etc.) at high temperature (for example, 600° C. to 800° C.) and a "gas containing oxygen (air, etc.)" are caused to flow as illustrated in FIG. 7. The fuel gas introduced from the introducing path 220 moves to the inner space of the manifold 200, and then, is introduced respectively into the gas flow paths 18 of the corresponding cells 100 through the insertion holes 211. The fuel gas having passed through each gas flow path 18 is discharged outside from the other end (free end) of each gas flow path 18. The air flows in the width direction (y-axis direction) of the cells 100 along the gap between the adjacent cells 100 in the stack structure.

The cantilever stack structure is assembled, for example, by the follow procedure. First, a required number of completed cells 100 and a completed manifold 200 are prepared. Next, the plurality of cells 100 are arranged and fixed in a stack shape through use of a predetermined jig or the like. Then, while maintaining the state in which the plurality of cells 100 are arranged and fixed in a stack shape, each one end of the plurality of cells 100 is inserted in a corresponding insertion hole 211 of the support plate 210 at a time. Then, each gap in a joining portion between the insertion hole 211 and one end of the cell 100 is filled with paste of an amorphous material (amorphous glass) for the joining material 300. At this time, as illustrated in FIG. 5, the paste may be supplied to the joining portion to such a degree that the paste protrudes upward from the surface of the support plate 210.

Then, the amorphous material paste filling the gap as described above is subjected to heat treatment (crystallization treatment). When the temperature of the amorphous material reaches a crystallization temperature thereof by the heat treatment, a crystal phase is generated in the amorphous material at the crystallization temperature, and crystallization proceeds. As a result, the amorphous material is solidified and formed into ceramics to become crystallized glass. Thus, the joining material 300 formed of the crystallized glass exhibits a function, and one end of each cell 100 is joined and fixed to the corresponding insertion hole 211. In other words, one end of each cell 100 is joined to and supported by the support plate 210 through use of the joining material 300. After that, the predetermined jig is removed from the plurality of cells 100, and thus, the above-mentioned cantilever stack structure is completed.

In the following, the "paste of an amorphous material (amorphous glass) for the joining material 300" is described additionally.

As one of poisoning elements which degrades the SOFC cell, there may be given boron (B). When B in a certain concentration or more is supplied to a fuel electrode, Ni particles forming the fuel electrode are enlarged, with the result that the reaction resistance of the fuel electrode increases and the SOFC cell is degraded. Glass as the joining material is suspected to be one of supply sources of B to the fuel electrode. From such a viewpoint, it has been desired that the content of B in the joining material 300 be reduced. Based on the above-mentioned finding, it is preferred that the content of B in the paste be 10 mol % or less.

Similarly, as a poisoning element which degrades the SOFC cell, impurities such as an alkali metal, phosphorus (P), sulfur (S), and chlorine (Cl) are known. Similarly to B, from the viewpoint of suppressing the degradation of the SOFC cell by poisoning, it has been desired that the content of the impurities in the joining material 300 be reduced. Based on the above-mentioned viewpoint, it is preferred that the content of each of an alkali metal, P, S, and Cl in the paste be 0.5 mol % or less.

It is required that a joining material to be used for joining the SOFC cell to another member have a high thermal expansion coefficient ($10 \times 10^{-6}$/K or more at 50° C. to 850° C.). In general, the glass composition in the paste is adjusted so that a crystal phase having a high thermal expansion coefficient is precipitated after the paste is crystallized by heat treatment. It has been recently found that, in this case, it is important to add barium (Ba) to glass in the paste in order to obtain crystallized glass containing a small amount of B and having a high thermal expansion coefficient of $11.0 \times 10^{-6}$/K or more at 50° C. to 850° C. Based on the above-mentioned viewpoint, it is preferred that the content of Ba in the glass in the paste be 5 mol % to 40 mol % in terms of BaO.

Incidentally, crystallized glass (crystallinity degree: 60% or more) obtained by crystallizing the paste by heat treatment includes a plurality of kinds of crystal phases. This is based on the following reason. That is, in general, during heat treatment, a pattern of temperature increase varies depending on a position in a space of a furnace to be used for heat treatment. Thus, during the heat treatment, a pattern of temperature increase of the paste also varies depending on a portion of the paste. As a result, a crystal phase to be precipitated may vary depending on a portion of the paste. For this reason, the crystallized glass obtained by crystallizing the paste may include a plurality of kinds of crystal phases.

(Suppression of Generation of Cracks in Joining Material)

Figure 8:
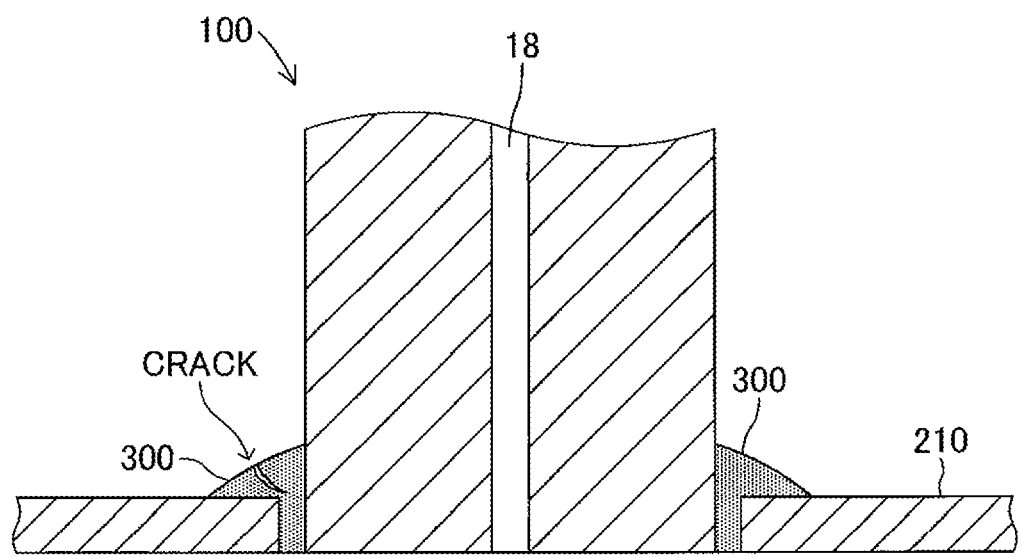
FIG. 8 is a view illustrating a state in which a crack is generated in a joining material in the joining portion between the insertion portion and one end of the cell.
Figure 8:
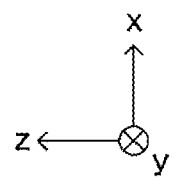

After the heat treatment of the amorphous material paste for the joining material 300, as illustrated in FIG. 8, a crack is generated from the surface to the inside of the joining material 300 formed of crystallized glass in some cases.

The inventor of the present invention conducted various experiments so as to overcome the problem of the generation of cracks. As a result, the inventor of the present invention found that there is a strong correlation between the generation of the cracks and the "volume reduction ratio of the joining material caused by the crystallization" (hereinafter referred to as "crystallization shrinkage ratio") in a process in which the crystallization of the amorphous material proceeds at the crystallization temperature. In the following, first, the "procedure for calculating the crystallization shrinkage ratio" based on which the finding has been obtained is described.

Figure 9:
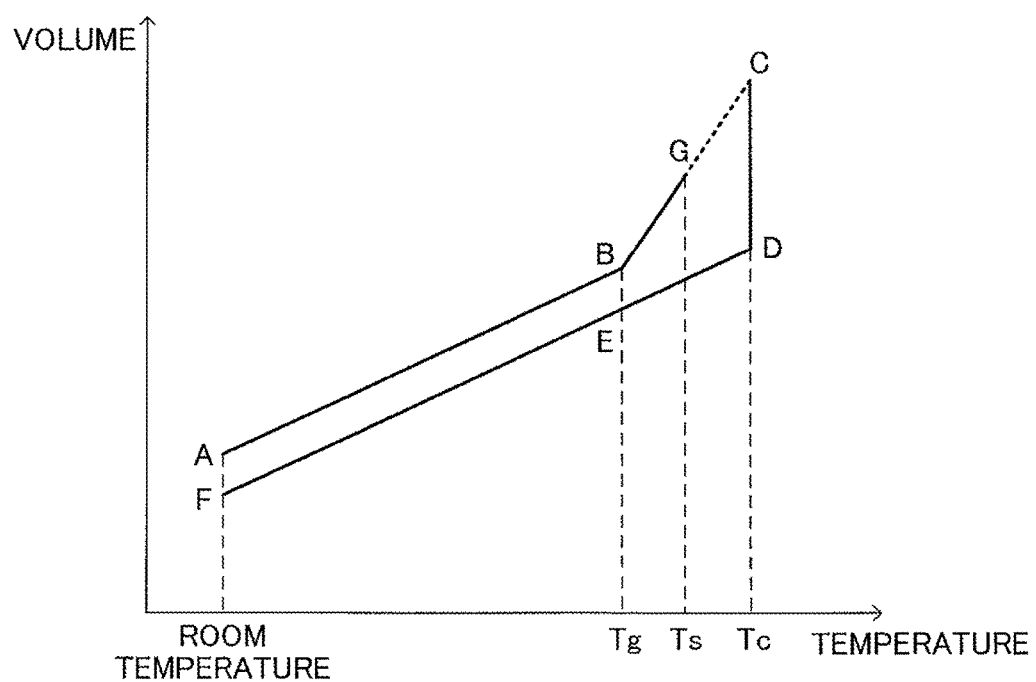
FIG. 9 is a graph showing a transition of a relationship between the temperature of an amorphous glass material and the volume thereof when the amorphous glass material is crystallized by heat treatment.

FIG. 9 shows an example of a transition of a relationship between the temperature and the volume of a (solidified) compact (test chip) of an amorphous glass material, when the compact is crystallized by heat treatment. In FIG. 9, Tg represents a glass transition point of the amorphous glass material, Ts represents a glass softening point of the amorphous glass material, and Tc represents a crystallization temperature of the amorphous glass material. Tg, Ts, and Tc are material physical properties obtained by heat analysis such as differential thermal analysis (DTA) or differential scanning calorimetry (DSC). A method of calculating Tg, Ts, and Tc by the DTA is described in detail in "For person who produces glass for the first time" written by Masayuki Yamane (Uchida Rokakuho), pp. 149-150, etc. In the following, for convenience of description, a volume of a compact at a point X (X: A to G) in FIG. 9 is expressed as "Vx."

A point A represents a state of the compact in an amorphous state at room temperature. When the temperature of the compact is raised from the state at the point A to reach the glass transition temperature Tg (point B), the volume of the compact increases from Va to Vb. In the state at the point B, the compact is in an amorphous state. Then, when the temperature of the compact is raised from the state at the point B to reach the glass softening point Ts (point G), the volume of the compact increases from Vb to Vg. In the process so far, Va can be calculated in advance through use of the compact of amorphous glass in a solidified state. In this case, Va is calculated as a value excluding pores present in the compact. Vb and Vg can be calculated by a known thermal expansion measurement device through use of Va calculated in advance. This is because, in a temperature region of the glass softening point Ts or less, the compact is not softened, and hence a three-dimensional shape of the compact can be maintained.

Next, when the temperature of the compact is further raised from the state at the point G, the compact starts being softened. Therefore, the three-dimensional shape of the compact cannot be maintained, and the volume of the compact cannot be measured through use of the known thermal expansion measurement device. Therefore, a volume Vc of the compact in the amorphous state at a time point when the temperature of the compact is raised from the state at the point G to reach the crystallization temperature Tc, that is, at a time point before crystallization of a material for the compact is started (point C) cannot be measured, either.

In this procedure, in order to estimate Vc, the hypothesis "increase gradient of the volume of the amorphous material with respect to an increase in temperature is constant from the glass transition point Tg to the crystallization temperature Tc" (see a broken line between the points G-C of the figure) is adopted. Vc is calculated by performing extrapolation with respect to a change in volume between Tg and Ts through use of the known Tg, Ts, and Tc and the measured Vb and Vg under the above-mentioned hypothesis. Note that, Vc may be calculated by performing extrapolation with respect to a change in volume between Tg and Tz through use of a predetermined temperature Tz between Tg and Ts and a (measured) volume of the compact at the predetermined temperatures Tz in place of Ts and Vg.

Next, when time elapses under the state in which the temperature of the compact is kept at the crystallization temperature Tc from the state at the point C, the crystallization of the material for the compact proceeds. At this time, the compact shrinks as the crystallization proceeds. When sufficient time elapses from the state at the point C and the crystallization (reduction in volume) of the material for the compact is completed (point D), the volume of the compact is reduced from Vc to Vd. In the state at the point D, the compact is in a crystallized state. In the state at the point D, the compact has been crystallized (solidified), and hence, as described later, Vd can be measured through use of the known thermal expansion measurement device. Note that, the "completion" of the crystallization of the material for the compact can be determined, for example, based on the fact that the reduction amount (reduction ratio) of the volume of the compact within a predetermined period of time decreases to a predetermined value or less.

When the temperature of the compact is lowered from the state at the point D to reach the glass transition point Tg (point E), the volume of the compact is reduced from Vd to Ve. In the state at the point E, the compact is in a crystallized state. Then, when the temperature of the compact is further lowered from the state at the point E to reach room temperature (point F), the volume of the compact is further reduced from Ve to Vf. In the state at the point F, the compact is also in a crystallized state. Vf can be calculated through use of the crystallized compact of crystallized glass. In this case, Vf is calculated as a value excluding pores present in the compact. Vd can be calculated through use of the known thermal expansion measurement device through use of Vf calculated as described above.

In this procedure, the "crystallization shrinkage ratio" (%) is calculated by the following expression (1) through use of the estimated Vc and the calculated Vd obtained as described above.

$$\text{Crystallization shrinkage ratio} = (Vd - Vc)/Vc \times 100 (\%) \quad (1)$$

In the following, a test confirming that there is a strong correlation between the generation of cracks and the "crystallization shrinkage ratio" is described.

(Test)

In this test, a plurality of samples of varying combinations of the material for the joining material 300 formed of crystallized glass and the crystallization shrinkage ratio (%) were produced regarding the cantilever stack structure (see FIG. 2). Specifically, as shown in Table 1, 10 kinds of levels (combinations) were prepared. 20 samples (N=20) were produced for each level. The crystallization shrinkage ratio shown in Table 1 is calculated by the expression (1).

TABLE 1

| LEVEL | MATERIAL FOR JOINING MATERIAL | CRYSTAL-LIZATION SHRINKAGE RATIO (%) | EVALUATION RESULT |
|---|---|---|---|
| 1 | $SiO_2$—$MgO$—$B_2O_5$—$Al_2O_3$ | 0.78 | No cracks (0/20) |
| 2 | $SiO_2$—$MgO$—$Al_2O_3$—$ZnO$ | 1.6 | No cracks (0/20) |
| 3 | $SiO_2$—$MgO$—$Al_2O_3$—$ZnO$ | 2.5 | No cracks (0/20) |
| 4 | $SiO_2$—$MgO$—$B_2O_5$—$Al_2O_3$ | 4.3 | No cracks (0/20) |
| 5 | $SiO_2$—$MgO$—$Al_2O_3$—$ZnO$ | 6.8 | No cracks (0/20) |
| 6 | $SiO_2$—$MgO$—$B_2O_5$—$Al_2O_3$ | 8.9 | No cracks (0/20) |
| 7 | $SiO_2$—$MgO$—$B_2O_5$—$Al_2O_3$ | 10.0 | No cracks (0/20) |
| 8 | $SiO_2$—$MgO$—$Al_2O_3$—$ZnO$ | 12.0 | No cracks (0/20) |
| 9 | $SiO_2$—$MgO$—$Al_2O_3$—$ZnO$ | 12.8 | Appearance of cracks (3/20) |
| 10 | $SiO_2$—$MgO$—$B_2O_5$—$Al_2O_3$ | 14.2 | Appearance of cracks (5/20) |

The crystallization shrinkage ratio of the joining material 300 can be adjusted by adjusting the "density ratio" (at normal temperature) of a crystal phase (crystallized glass) and an amorphous phase (amorphous glass) included in the crystallized joining material (density of crystal phase/density of amorphous phase). In general, there is the following tendency: as the "density ratio" is larger, the "crystallization shrinkage ratio" of the joining material is larger (so-called monotonic increase). It is preferred that the "density ratio" be adjusted in a range of 1.01 to 1.05. The "density ratio" is adjusted specifically as follows.

First, in the case where only one kind of crystal phase is included in the crystallized joining material, the "density ratio" can be increased (decreased) by increasing (decreasing) the density of the crystal phase. In order to adjust the density of the crystal phase, it is considered to replace an element forming the amorphous glass (in the stage before the crystallization treatment). In this case, in order to increase (decrease) the density of the crystal phase, it is effective to replace the element forming the amorphous glass with an element having a substantially equal ion radius and having a larger (smaller) atomic number.

On the other hand, in the case where a plurality of kinds of crystal phases are included in the crystallized joining material, the "density ratio" can be adjusted by adjusting the crystallized ratio between the crystal phases. For example, in the case where the crystallized joining material includes a "crystal phase A having a high density" and a "crystal phase B having a low density," the "density ratio" can be increased (decreased) by increasing (decreasing) the crystallized ratio of the crystal phase A. In order to increase (decrease) the crystallized ratio of the crystal phase A at a time of crystallization treatment, it is appropriate that the retention time of the crystal phase A at the crystallization temperature be set to be longer (shorter) than the retention time of the crystal phase B at the crystallization temperature irrespective of the difference in degree between the crystallization temperature of the crystal phase A and the crystallization temperature of the crystal phase B.

The "density ratio" (="density of crystal phase"/"density of amorphous phase") can be calculated through use of the "density of a crystal phase" and the "density of an amorphous phase" obtained by the following method. The "density of a crystal phase" can be theoretically calculated based on information obtained by identification of a crystal phase through X-ray diffraction and crystal structure analysis through Rietveld refinement. For example, in the case where only one kind of crystal phase is precipitated after crystallization treatment, the density calculated by the above-mentioned method regarding the one kind of crystal phase can be defined as the "density of a crystal phase." Further, in the case where a plurality of kinds of crystal phases are precipitated after the crystallization treatment, a value is calculated by multiplying the density calculated by the above-mentioned method regarding each of the plurality of kinds of crystal phases by a precipitation volume ratio of the corresponding crystal phase. The sum of those values can be defined as the "density of a crystal phase," On the other hand, the "density of an amorphous phase" is obtained by correcting the density of glass in an amorphous state calculated through use of so-called "Archimedes measurement," etc., by a closed pore ratio. The closed pore ratio can be separately obtained by observing the structure of the glass in the amorphous state through use of an SEM or the like.

As a shape of a side surface of one end in the first longitudinal direction (x-axis direction) of the cell 100 used in each sample (see FIG. 2), an oval shape having a length L2 of 30 mm and a width L3 of 3 mm (L2>L3) was adopted similarly to FIG. 6. As a shape of an opening of the insertion hole 211, an oval shape having a length L4 larger than the length L2 by 0.5 mm and a width L5 larger than the width L3 by 0.5 mm (L4>L5) was adopted similarly to in FIG. 6. As a material for the support plate 210 (manifold 200), stainless steel was used. In each sample, the paste of an amorphous material filling the gap was subjected to heat treatment at a temperature of 850° C. for 1 to 5 hours. As a result, the joining material 300 formed of crystallized glass exhibited a function, and one end of each cell 100 was joined to the support plate 210 (stack structure was completed).

Then, each sample in a stage before the reducing treatment was checked for the presence/absence of the generation of cracks in the joining material 300. The check was performed by visual inspection and by observation using a microscope. Table 1 shows the results.

As is understood from Table 1, when the crystallization shrinkage ratio is larger than 12%, cracks are generated easily from the surface to the inside of the joining material 300, as illustrated in FIG. 8. The reason for this is considered as follows. That is, when a paste of an amorphous material for the joining material 300 is subjected to heat treatment, after the temperature of the joining material reaches the "glass softening point" slightly lower than the "crystallization temperature," the joining material (amorphous glass in this stage) starts being bound at the interface with respect to the inner wall of the insertion hole 211 and at the interface with respect to the outer wall of one end of the cell 100. After that, when the temperature of the joining material (amorphous glass in this stage) reaches the "crystallization temperature," the joining material 300 attempts to shrink as the crystallization of the amorphous glass proceeds at the "crystallization temperature" (crystallization shrinkage). Thus, after the crystallization shrinkage starts, the joining material attempts to shrink while being bound by the periphery (portion to be joined). As a result, an internal stress (tensile stress) is applied to the joining material. Consequently, when the crystallization shrinkage ratio is large, cracks are generated easily in the joining material 300.

On the other hand, as is understood from Table 1, it can be said that, when the crystallization shrinkage ratio is within a range of 12% or less, cracks are not generated easily. Note that, in the case where the crystallization shrinkage ratio is less than 0.78%, when a paste of an amorphous material filling the gap is subjected to heat treatment, the flowability of the paste becomes very poor. As a result, the joining between one end of each cell 100 and the support plate 210 becomes insufficient, and the situation in which a gas may leak from the manifold 200 to outside easily occurs, which has been determined separately. The result corresponds to the case where the shape of the side surface of one end of the cell 100 and the shape of the opening of the insertion hole 211 are oval shapes. However, it has been confirmed that the same result can also be obtained even when the shape of the side surface of one end of the cell 100 and the shape of the opening of the insertion hole 211 are, for example, circles.

It can be understood from the above-mentioned point that it is preferred that the crystallization shrinkage ratio of the joining material 300 be 0.78% or more and 12% or less in order to suppress the situation in which cracks are generated from the surface to the inside of the joining material 300 formed of crystallized glass.

Note that, the "crystallization shrinkage ratio" as used herein may be a value after the "treatment of exposing a glass material to the crystallization temperature Tc continuously" is conducted a plurality of times, instead of a value after the "treatment of exposing a glass material to the crystallization temperature Tc continuously" is conducted only one time as in the example shown in FIG. 9.

Specifically, for example, the following case is assumed: the paste of an amorphous material is subjected to heat treatment (crystallization) with the pattern shown in FIG. 9 to join one end of each of the plurality of cells to the support plate, to thereby complete a stack structure, and thereafter, the temperature of the SOFC of the completed stack structure is raised to the crystallization temperature Tc (or temperature in the vicinity of Tc) to operate the SOFC continuously. In this case, the "treatment of exposing a glass material to the crystallization temperature Tc continuously" is performed twice. Then, in the second treatment (that is, during the operation of the SOFC), the crystallization of the glass material further proceeds from the state at a time of the completion of the first treatment (the crystallization shrinkage ratio increases further). In this case, in the expression (1), the crystallization shrinkage ratio can be calculated through use of a value in the stage of the completion of the second treatment (that is, the operation of the SOFC) as Vd. If the calculated value is within 0.78% or more and 12% or less, the situation in which cracks are generated in the joining material 300 can be suppressed.

The method of calculating the crystallization shrinkage ratio described above can be similarly applied to the case where, after the stack structure is completed (after the crystallization treatment of the paste of the amorphous material is completed), the situation in which the temperature of the SOFC of the completed stack structure is raised to the crystallization temperature Tc (or temperature in the vicinity of Tc) to operate the SOFC continuously occurs a plurality of times (that is, the case where the "treatment of exposing a glass material to the crystallization temperature Tc continuously" is performed three times or more). That is, the crystallization shrinkage ratio is calculated through use of a value in the stage of the completion of the final treatment (final operation of the SOFC) as Vd.

The present invention is not limited to the embodiment described above, and various modified examples can be adopted within the scope of the present invention. For example, the embodiment described above adopts a configuration of a so-called "vertical stripe type" including a plurality of cells laminated therein, the plurality of cells each including only one "power-generation element part including a fuel electrode, a solid electrolyte, and an air electrode laminated in the stated order" on the surface of the support substrate. However, a so-called "lateral stripe type" cell may be adopted, in which the power generation element parts are provided respectively in a plurality of portions away from each other on the surface of the support substrate, and the adjacent power generation element parts are electrically connected to each other. Further, in the embodiment described above, although the cell (support substrate) has a plate shape, the cell (support substrate) may have a cylindrical shape.

Figure 10:
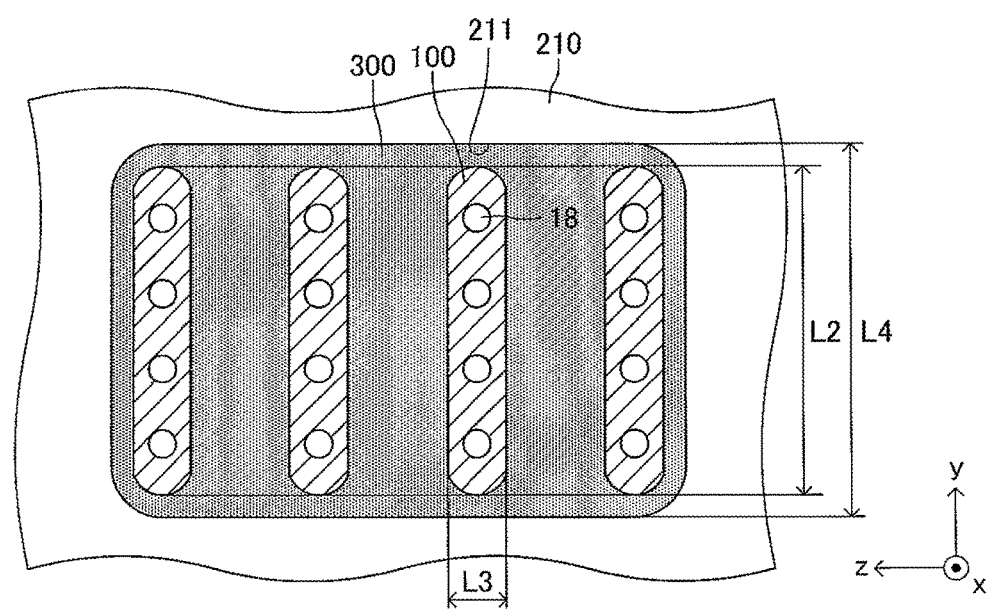
FIG. 10 is a view corresponding to FIG. 6 in the case where ends of a plurality of cells on one side are inserted in one insertion hole.

Further, in the cell of the embodiment described above, the fuel electrode and the air electrode may be replaced with each other. In this case, a flow of gas obtained by replacing a fuel gas and air with each other is adopted in FIG. 7. Further, in the embodiment described above, although one end of one cell is inserted in one insertion hole formed on the support plate, ends of two or more cells 100 on one side may be inserted in one insertion hole 211 formed on the support substrate, as illustrated in FIG. 10. Note that, in FIG. 10, the intervals between the adjacent cells 100, 100 are illustrated with exaggeration. In the case illustrated in FIG. 10, the y-axis direction is also used as the "direction of the symmetrical axis" of the insertion hole 211 similarly to in the case illustrated in FIG. 6. That is, one end of each cell 100 is inserted in the corresponding insertion hole 211 so that the "second longitudinal direction" (length direction of the side surface of one end of the cell 100) coincides with the "direction of the symmetrical axis" (y-axis direction) of the insertion hole 211. Further, all the ends of the plurality of cells on one side may be inserted in one (only one) insertion hole formed on the support plate.

Figure 11:
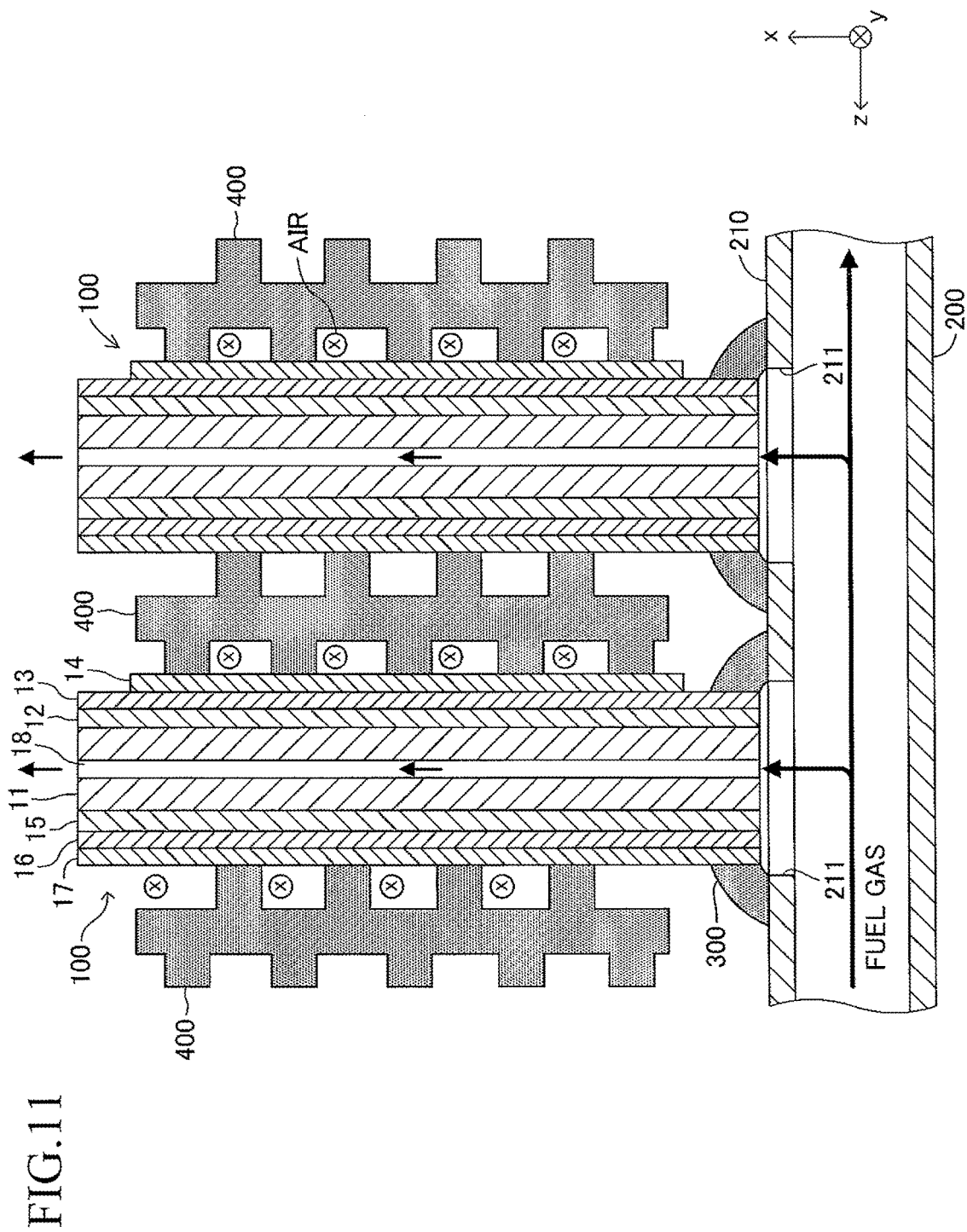
FIG. 11 is a view corresponding to FIG. 5 in the case where the cells are arranged on a support plate so that one end of the cell does not enter a hole of the support plate.

Further, in the embodiment described above, although one end of the cell 100 is inserted in the insertion hole 211 (that is, one end of the cell 100 enters the inner space of the insertion hole 211) (see FIG. 5 and the like), one end of the cell 100 may not be inserted in the insertion hole 211 (that is, one end of the cell 100 may not enter the inner space of the insertion hole 211) as illustrated in FIG. 11. In this case, the joining material 300 is provided so as to fill a space present between the insertion hole 211 and one end of the cell 100 in each joining portion between each insertion hole 211 and one end of the cell 100.

Further, in the embodiment described above, although the top board of the manifold also serves as the support plate for supporting a large number of cells (that is, the support plate is integrated with the manifold), the support plate may be formed separately from the manifold as long as the inner space of the manifold and the gas flow paths of the plurality of cells communicate with each other.

Another example of the cell illustrated in FIG. 1 is hereinafter described with reference to FIGS. 12 to 29.
(Configuration)

Figure 12:
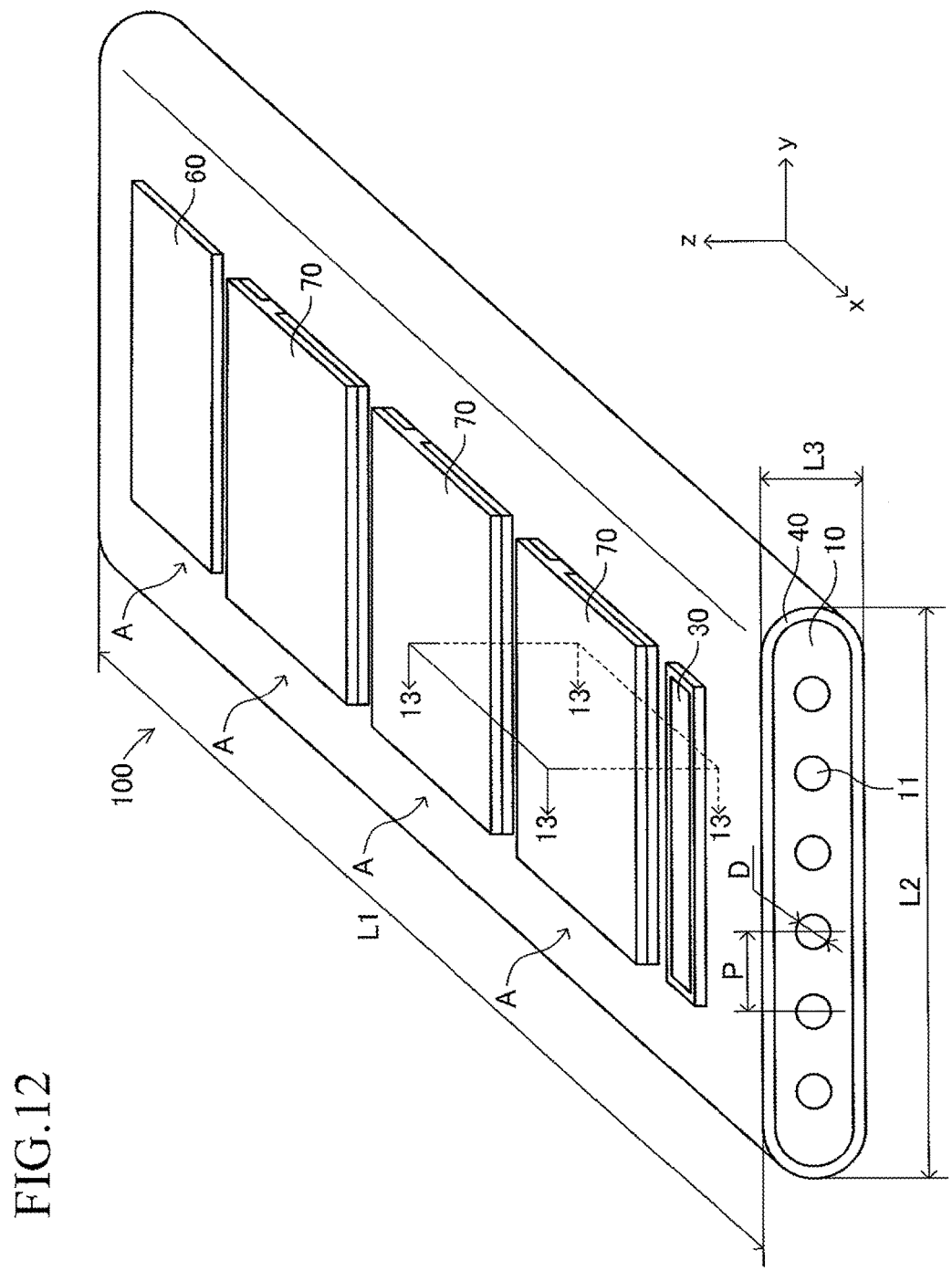
FIG. 12 is a perspective view illustrating another example of the one cell used in the stack structure of the fuel cell according to the embodiment of the present invention.

FIG. 12 illustrates a cell 100 according to another example of the cell illustrated in FIG. 1. The cell 100 has a configuration of a so-called "lateral stripe type" in which a plurality of (in this example, four) power generation element parts A of the same shape electrically connected in series to each other are arranged at predetermined intervals in a longitudinal direction on each of upper and lower surfaces (principal surfaces (planes) on both sides parallel to each other) of a plate-like support substrate 10 having the longitudinal direction (x-axis direction).

Figure 13:
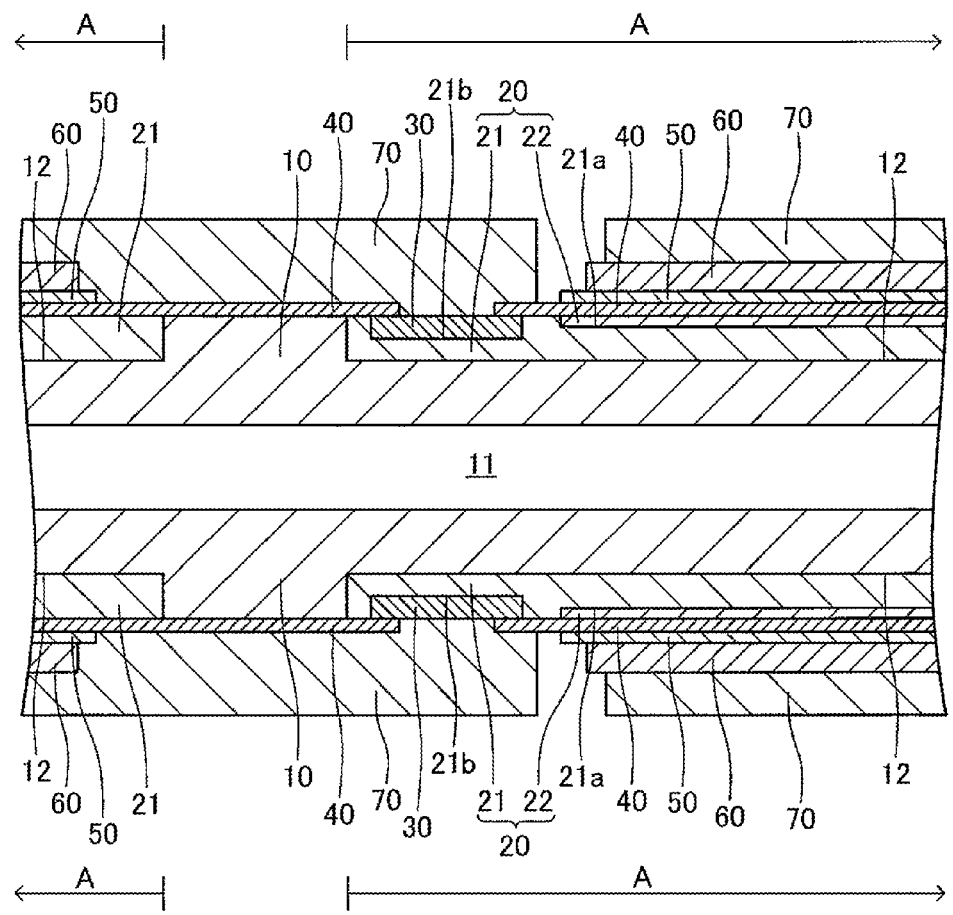
FIG. 13 is a sectional view taken along the line 13-13 of the cell illustrated in FIG. 12.

The shape of the entire cell 100 viewed from above is, for example, a rectangle in which the length of a side of the cell 100 in the longitudinal direction is 5 cm to 50 cm and the length of a side thereof in a width direction (y-axis direction) orthogonal to the longitudinal direction is 1 cm to 10 cm. The thickness of the entire cell 100 is 1 mm to 5 mm. The entire cell 100 has a vertically symmetrical shape with respect to a plane which passes through a center in the thickness direction and is parallel to the principal surface of the support substrate 10. In the following, the cell 100 is described in detail with reference to FIG. 13 which is a partial sectional view of the cell 100 taken along the line 13-13 of FIG. 12, in addition to FIG. 12. FIG. 13 is a partial sectional view illustrating (a part of) each configuration of a typical one set of the power generation element parts A, A adjacent to each other and a configuration between the power generation element parts A, A. The configuration between adjacent power generation element parts A, A of the other sets is similar to that of the configuration illustrated in FIG. 13.

Figure 17:
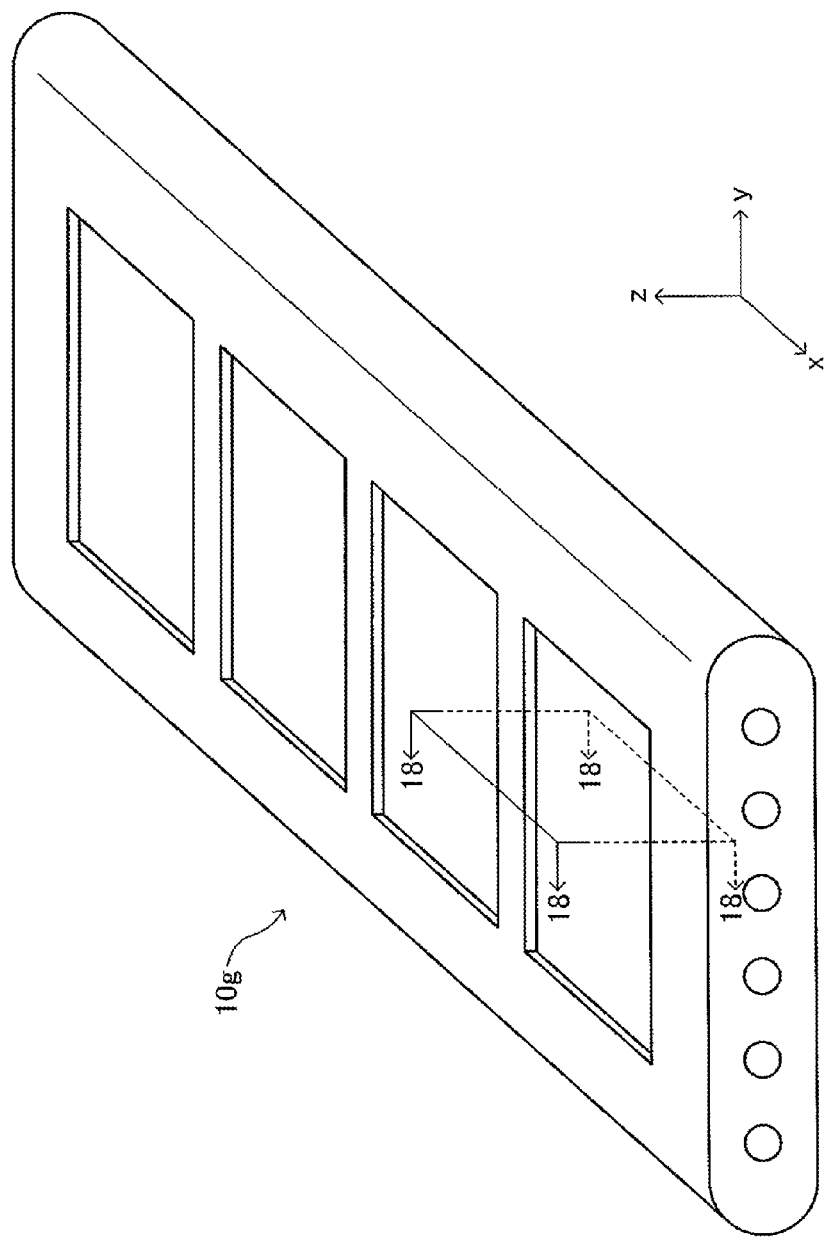
FIG. 17 is a perspective view illustrating the support substrate illustrated in FIG. 12.

The support substrate 10 is a plate-like fired body made of a porous material having no electron conductivity. As illustrated in FIG. 17 described later, a plurality of (in this example, six) fuel gas flow paths 11 (through-holes) extending in the longitudinal direction are arranged in the support substrate 10 at predetermined intervals in the width direction. In this example, each concave portion 12 is a recess formed into a rectangular solid shape defined by a bottom wall made of a material for the support substrate 10 and side walls (two side walls in the longitudinal direction and two side walls in the width direction) closed in a circumferential direction, which are made of a material for the support substrate 10 around the entire periphery.

The support substrate 10 may be formed of, for example, calcia-stabilized zirconia (CSZ). Alternatively, the support substrate 10 may be formed of a nickel oxide (NiO) and yttria-stabilized zirconia (YSZ) (8YSZ), a nickel oxide (NiO) and yttria ($Y_2O_3$), or a magnesium oxide (MgO) and magnesia-alumina spinel ($MgAl_2O_4$).

The support substrate 10 may contain a "transition metal oxide or transition metal" and an insulating ceramics. As the "transition metal oxide or transition metal," a nickel oxide (NiO) or nickel (Ni) is suitable. The transition metal may function as a catalyst which enhances a reforming reaction of a fuel gas (catalyst for reforming hydrocarbon-based gas). In addition, as the insulating ceramics, a magnesium oxide (MgO) or a "mixture of magnesia-alumina spinel ($MgAl_2O_4$) and a magnesium oxide (MgO)" is suitable. In addition, as the insulating ceramics, calcia-stabilized zirconia (CSZ), yttria-stabilized zirconia (YSZ) (8YSZ), and yttria ($Y_2O_3$) may be used.

As described above, when the support substrate 10 contains the "transition metal oxide or transition metal," in the process of supplying a gas containing an unreformed remaining gas component from the fuel gas flow path 11 to the fuel electrode through a large number of pores in the porous support substrate 10, the reformation of the unreformed remaining gas component can be accelerated by the catalytic function. In addition, when the support substrate 10 contains the insulating ceramics, the insulating property of the support substrate 10 can be ensured. As a result, the insulating property between the adjacent fuel electrodes can be ensured.

A thickness of the support substrate 10 is 1 mm to 5 mm. In the following, only the configuration of an upper surface side of the support substrate 10 is described for simplicity of the description, considering that the shape of the structure is vertically symmetrical. The same also applies to the configuration on a lower surface side of the support substrate 10.

Figure 14:
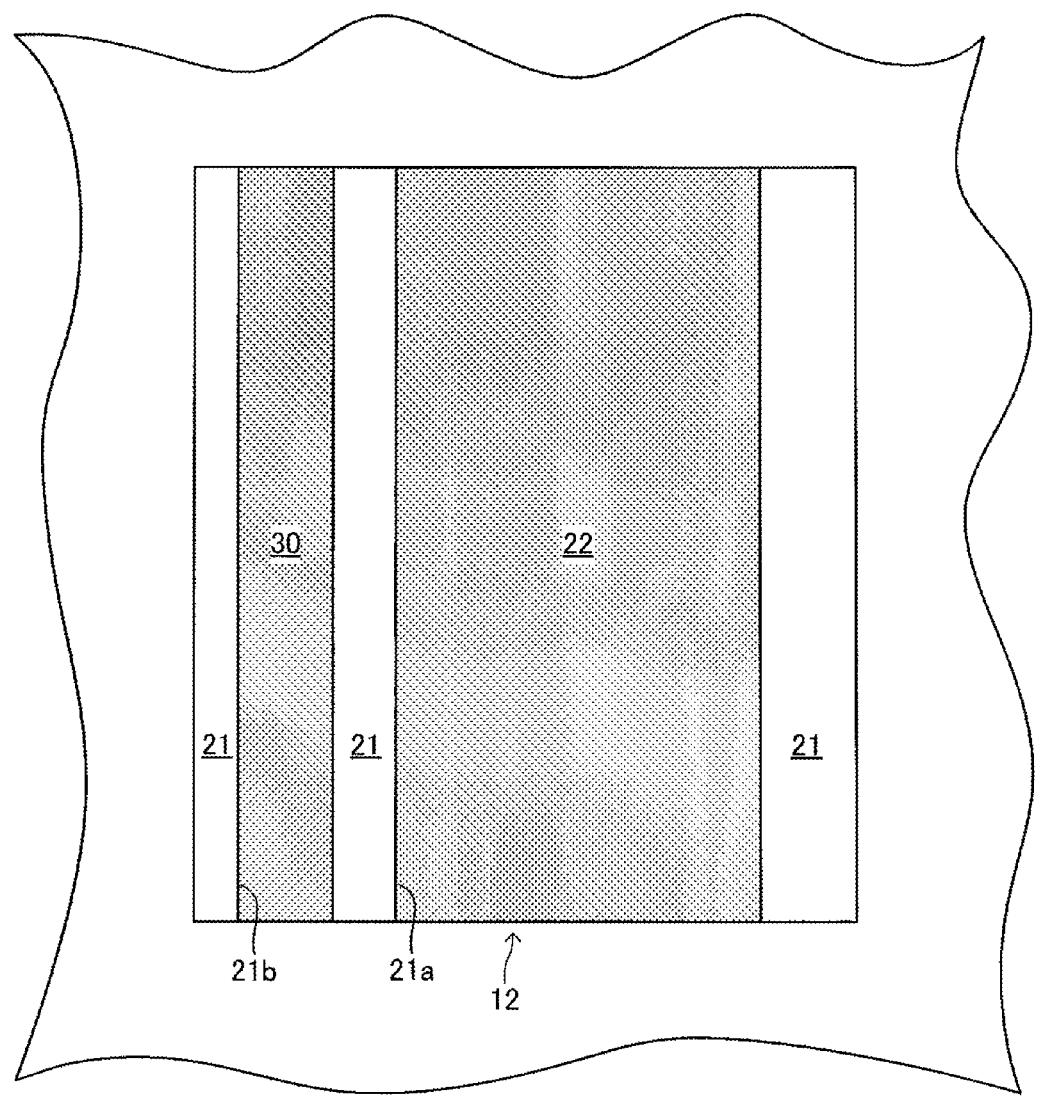
FIG. 14 is a plan view illustrating a state of a fuel electrode and an interconnector buried in concave portions of a support substrate illustrated in FIG. 12.

As illustrated in FIGS. 13 and 14, in each concave portion 12 formed on the upper surface (principal surface on the upper side) of the support substrate 10, each entire fuel-electrode current-collecting portion 21 is buried (filled). Thus, each fuel-electrode current-collecting portion 21 exhibits a rectangular solid shape. A concave portion 21a is formed on the upper surface (outer surface) of each fuel-electrode current-collecting portion 21. Each concave portion 21a is a recess formed into a rectangular solid shape defined by a bottom wall made of a material for the fuel-electrode current-collecting portion 21 and side walls (two side walls in the longitudinal direction and two side walls in the width direction) closed in a circumferential direction. Of the side walls closed in the circumferential direction, the two side walls in the longitudinal direction are made of the material for the support substrate 10, and the two side walls in the width direction are made of the material for the fuel-electrode current-collecting portion 21.

In each concave portion 21a, each entire fuel-electrode active portion 22 is buried (filled). Thus, each fuel-electrode active portion 22 exhibits a rectangular solid shape. The fuel-electrode current-collecting portion 21 and the fuel-electrode active portion 22 form a fuel electrode 20. The fuel electrode 20 (fuel-electrode current-collecting portion 21 and fuel-electrode active portion 22) is a fired body made of a porous material having electron conductivity. Two side surfaces in the width direction and the bottom surface of each fuel-electrode active portion 22 are provided in contact with the fuel-electrode current-collecting portion 21 in the concave portion 21a.

In a portion excluding the concave portion 21a in the upper surface (outer surface) of each fuel-electrode current-collecting portion 21, a concave portion 21b is formed. Each concave portion 21b is a recess formed into a rectangular solid shape defined by a bottom wall made of the material for the fuel-electrode current-collecting portion 21 and side walls (two side walls in the longitudinal direction and two side walls in the width direction) closed in the circumferential direction. Of the side walls closed in the circumferential direction, the two side walls in the longitudinal direction are made of the material for the support substrate 10, and the two side walls in the width direction are made of the material for the fuel-electrode current-collecting portion 21.

In each concave portion 21b, an interconnector 30 is buried (filled). Thus, each interconnector 30 exhibits a rectangular solid shape. The interconnector 30 is a fired body made of a dense material having electron conductivity. Two side surfaces in the width direction and the bottom surface of each interconnector 30 are provided in contact with the fuel-electrode current-collecting portion 21 in the concave portion 21b.

The upper surface (outer surface) of the fuel electrode 20 (fuel-electrode current-collecting portion 21 and fuel-electrode active portion 22), the upper surface (outer surface) of the interconnector 30, and the principal surface of the support substrate 10 form one plane (plane which is the same as the principal surface of the support substrate 10 in a case where the concave portion 12 is not formed). That is, a step difference is not formed among the upper surface of the fuel electrode 20, the upper surface of the interconnector 30, and the principal surface of the support substrate 10.

The fuel-electrode active portion 22 may be formed of, for example, a nickel oxide (NiO) and yttria-stabilized zirconia (YSZ) (8YSZ). Alternatively, the fuel-electrode active portion 22 may be formed of a nickel oxide (NiO) and gadolinium doped ceria (GDC). The fuel-electrode current-collecting portion 21 may be formed of, for example, a nickel oxide (Ng)) and yttria-stabilized zirconia (YSZ) (8YSZ). Alternatively, the fuel-electrode current-collecting portion 21 may be formed of a nickel oxide (NiO) and yttria ($Y_2O_3$) or a nickel oxide (NiO) and calcia-stabilized zirconia (CSZ). The thickness of the fuel-electrode active portion 22 is 5 μm to 30 μm, and the thickness of the fuel-electrode current-collecting portion 21 (that is, depth of the concave portion 12) is 50 μm to 500 μm.

Thus, the fuel-electrode current-collecting portion 21 contains a substance having electron conductivity. The fuel-electrode active portion 22 contains a substance having electron conductivity and a substance having an oxidizing ion (oxygen ion) conductivity. The "volume ratio of the substance having oxidizing ion conductivity with respect to the entire volume excluding the pore portion" in the fuel-electrode active portion 22 is larger than the "volume ratio of the substance having oxidizing ion conductivity with respect to the total volume excluding the pore portion" in the fuel-electrode current-collecting portion 21.

The interconnector 30 may be formed of, for example, lanthanum chromite ($LaCrO_3$). Alternatively, the interconnector 30 may be formed of strontium titanate (($Sr,La)TiO_3$). The thickness of the interconnector 30 is 10 μm to 100 μm.

The entire outer peripheral surface extending in the longitudinal direction of the support substrate 10 in a state in which the fuel electrode 20 and the interconnector 30 are buried in the respective concave portions 12 excluding longitudinal center portions of respective portions in which a plurality of interconnectors 30 are formed is covered with a solid electrolyte film 40. The solid electrolyte film 40 is a fired body made of a dense material having ion conductivity and having no electron conductivity. The solid electrolyte film 40 may be formed of, for example, yttria-stabilized zirconia (YSZ) (8YSZ). Alternatively, the solid electrolyte film 40 may be formed of lanthanum gallate (LSGM). The thickness of the solid electrolyte film 40 is 3 μm to 50 μm.

That is, the entire outer peripheral surface extending in the longitudinal direction of the support substrate 10 in the state in which the fuel electrode 20 is buried in each concave portion 12 is covered with a dense layer formed of the interconnector 30 and the solid electrolyte film 40. The dense layer exhibits a gas sealing function of preventing mixing of a fuel gas flowing through a space inside the dense layer and air flowing through a space outside of the dense layer.

As illustrated in FIG. 13, in this example, the solid electrolyte film 40 covers the upper surface of the fuel electrode 20, both longitudinal side end portions of the upper surface of the interconnector 30, and the principal surface of the support substrate 10. In this case, as described above, there is no step difference among the upper surface of the fuel electrode 20, the upper surface of the interconnector 30, and the principal surface of the support substrate 10. Thus, the solid electrolyte film 40 is flattened. As a result, compared with the case where a step difference is formed in the solid electrolyte film 40, the generation of cracks in the solid electrolyte film 40 caused by the concentration of a stress can be suppressed, and a degradation in the gas sealing function of the solid electrode film 40 can be suppressed.

On an upper surface of the solid electrolyte film 40 at a position provided in contact with each fuel-electrode active portion 22, an air electrode 60 is formed through intermediation of a reaction preventing film 50. The reaction preventing film 50 is a fired body made of a dense material, and the air electrode 60 is a fired body made of a porous material having electron conductivity. The shapes of the reaction preventing film 50 and the air electrode 60 when viewed from above are each a rectangle substantially identical to that of the fuel-electrode active portion 22.

The reaction preventing film 50 may be formed of, for example, gadolinium doped ceria (GDC=$(Ce,Gd)P_2$). The thickness of the reaction preventing film 50 is 3 μm to 50 μm. The air electrode 60 may be formed of, for example, lanthanum strontium cobalt ferrite (LSCF=$(La,Sr)(Co,Fe)O_3$). Alternatively, the air electrode 60 may be formed of, for example, lanthanum strontium ferrite (LSF=$(La,Sr)FeO_3$), lanthanum nickel ferrite (LNF=$La(Ni,Fe)O_3$), or lanthanum strontium cobaltite (LSC=$(La,Sr)CoO_3$). In addition, the air electrode 60 may be formed by two layers including a first layer (inner layer) formed of LSCF and a second layer (outer layer) formed of LSC. The thickness of the air electrode 60 is 10 μm to 100 μm.

The reason for interposing the reaction preventing film 50 is to suppress the occurrence of a phenomenon in which YSZ in the solid electrolyte film 40 and Sr in the air electrode 60 react with each other during the production of the SOFC or in the SOFC which is being operated to form a reactive layer having a large electric resistance at an interface between the solid electrolyte film 40 and the air electrode 60.

In this case, a laminate in which the fuel electrode 20, the solid electrolyte film 40, the reaction preventing film 50, and the air electrode 60 are laminated corresponds to the "power generation element part A" (see FIG. 13). That is, a plurality of (in this example, four) power generation element parts A are arranged on the upper surface of the support substrate 10 at predetermined intervals in the longitudinal direction.

In each set of the adjacent power generation element parts A, A, an air-electrode current-collecting film 70 is formed on the upper surfaces of the air electrode 60, the solid electrolyte film 40, and the interconnector 30 so as to stride across the air electrode 60 in one power generation element part A (left side in FIG. 13) and the interconnector 30 in the other power generation element part A (right side in FIG. 13). The air-electrode current-collecting film 70 is a fired body made of a porous material having electron conductivity. The shape of the air-electrode current-collecting film 70 when viewed from above is a rectangle.

The air-electrode current-collecting film 70 may be formed of, for example, lanthanum strontium cobalt ferrite (LSCF=$(La,Sr)(Co,Fe)O_3$). Alternatively, the air-electrode current-collecting film 70 may be formed of lanthanum strontium cobaltite (LSC=$(La,Sr)CoO_3$). Alternatively, the air-electrode current-collecting film 70 may be formed of silver (Ag) or a silver-palladium alloy (Ag—Pd). The thickness of the air-electrode current-collecting film 70 is 50 μm to 500 μm.

Thus, when each air-electrode current-collecting film 70 is formed, in each set of the adjacent power generation element parts A, A, the air electrode 60 in one power generation element part A (left side in FIG. 13) and the fuel electrode 20 (in particular, the fuel-electrode current-collecting portion 21) in the other power generation element part A (right side in FIG. 13) are electrically connected to each other through intermediation of the "air-electrode current-collecting film 70 and interconnector 30" having electron conductivity. As a result, a plurality of (in this example, four) power generation element parts A arranged on the upper surface of the support substrate 10 are electrically connected in series. In this case, the "air-electrode current-collecting film 70 and interconnector 30" having electron conductivity correspond to an "electrical connecting portion."

The interconnector 30 corresponds to a "first portion formed of a dense material" in the "electrical connecting portion" and has a porosity of 10% or less. The air-electrode current-collecting film 70 corresponds to a "second portion formed of a porous material" in the "electrical connecting portion" and has a porosity of 20% to 60%.

Figure 15:
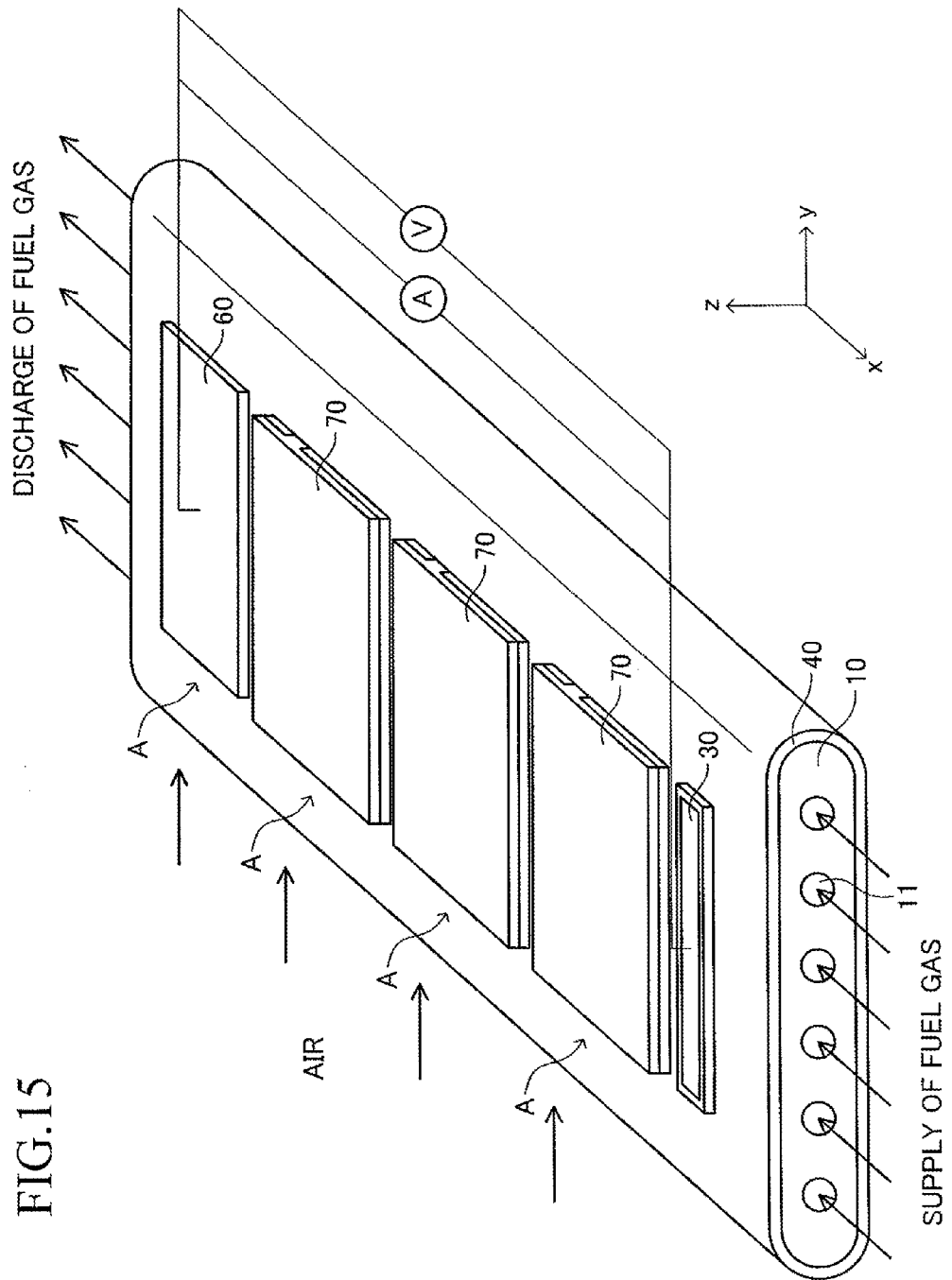
FIG. 15 is a view illustrating an operation state of the cell illustrated in FIG. 12.

When a fuel gas (hydrogen gas, etc.) is allowed to flow through the fuel gas flow path 11 of the support substrate 10, and the upper and lower surfaces (in particular, each air-electrode current-collecting film 70) of the support substrate 10 are exposed to the "oxygen-containing gas" (air, etc.) (or the oxygen-containing gas is allowed to flow along the upper and lower surfaces of the support substrate 10) as illustrated in FIG. 15 with respect to the "horizontal-striped" cell 100 of FIG. 12 described above, an electromotive force is generated due to an oxygen partial pressure difference caused between both side surfaces of the solid electrolyte film 40. Further, when the structure is connected to an outside load, chemical reactions represented by the following formulae (2) and (3) occur, and a current flows (power-generating state).

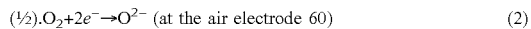

$$(\tfrac{1}{2}) \cdot O_2 + 2e^- \rightarrow O^{2-} \text{ (at the air electrode 60)} \quad (2)$$

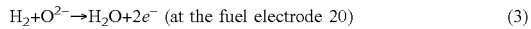

$$H_2 + O^{2-} \rightarrow H_2O + 2e^- \text{ (at the fuel electrode 20)} \quad (3)$$

Figure 16:
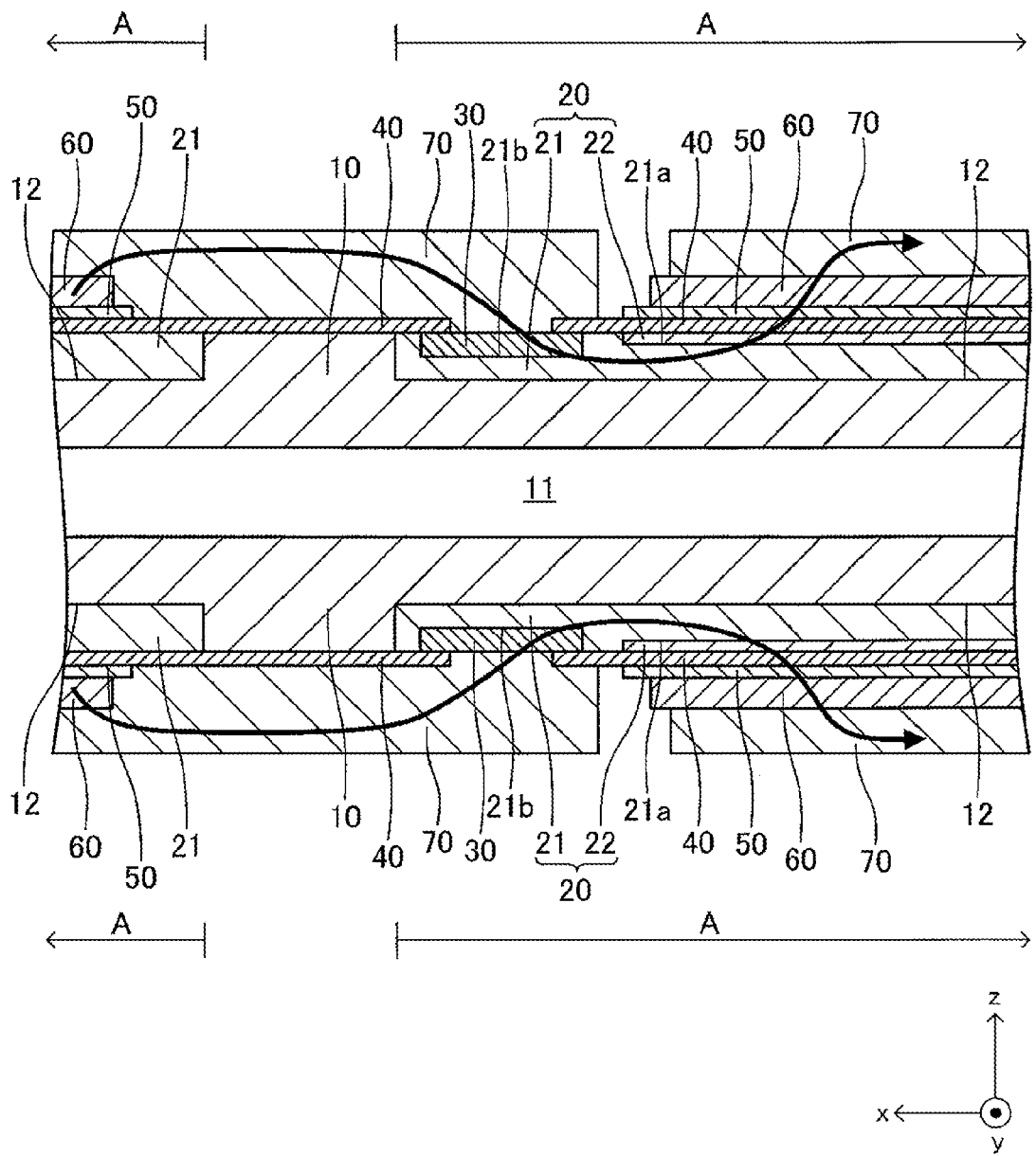
FIG. 16 is a view illustrating a flow of a current in the operation state of the cell illustrated in FIG. 12.

In the power-generating state, as illustrated in FIG. 16, a current flows as indicated by arrows in each set of the adjacent power generation element parts A, A. As a result, as illustrated in FIG. 15, electric power is taken out of the entire cell 100 (specifically, through the interconnector 30 in the power generation element part A on the frontmost side and the air electrode 60 in the power generation element part A on the backmost side in FIG. 15).

(Production Method)

An example of a method of producing the "horizontal-striped" cell 100 illustrated in FIG. 12 is described briefly with reference to FIGS. 17 to 25. In FIGS. 17 to 25, "g" as the suffix of a symbol of each member indicates that the member is "unfired."

First, a support substrate compact 10g having a shape illustrated in FIG. 17 is produced. The support substrate compact 10g can be produced by a procedure such as extrusion molding or cutting through use of slurry obtained by adding a binder or the like to powder of a material (for example, CSZ) of the support substrate 10. In the following, description is continued with reference to FIGS. 18 to 25 each illustrating a partial section taken along the line 18-18 of FIG. 17.

Figure 18:
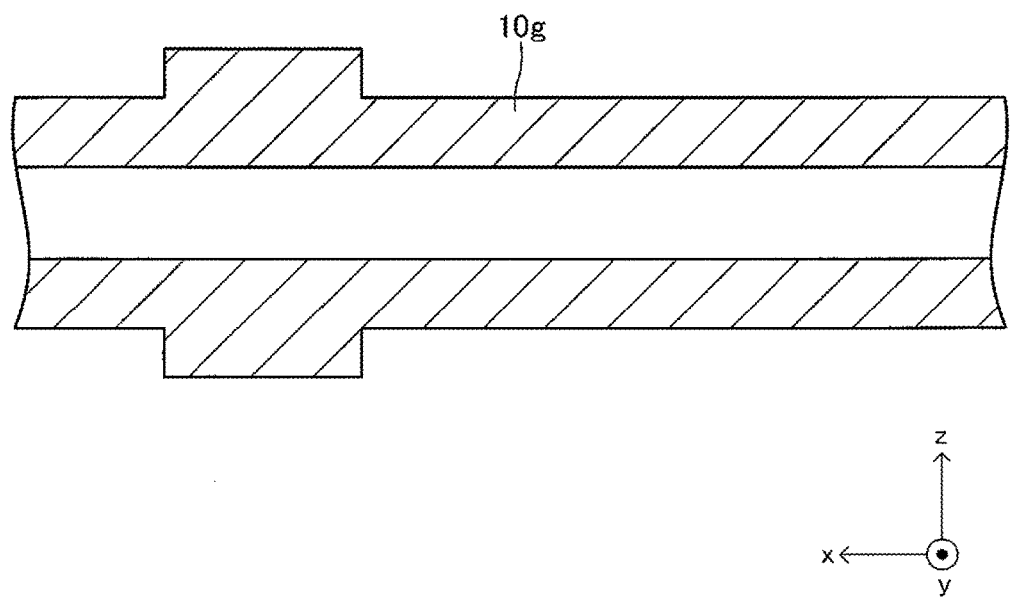
FIG. 18 is a sectional view corresponding to FIG. 13 in a first stage of a production process for the cell illustrated in FIG. 12.
Figure 19:
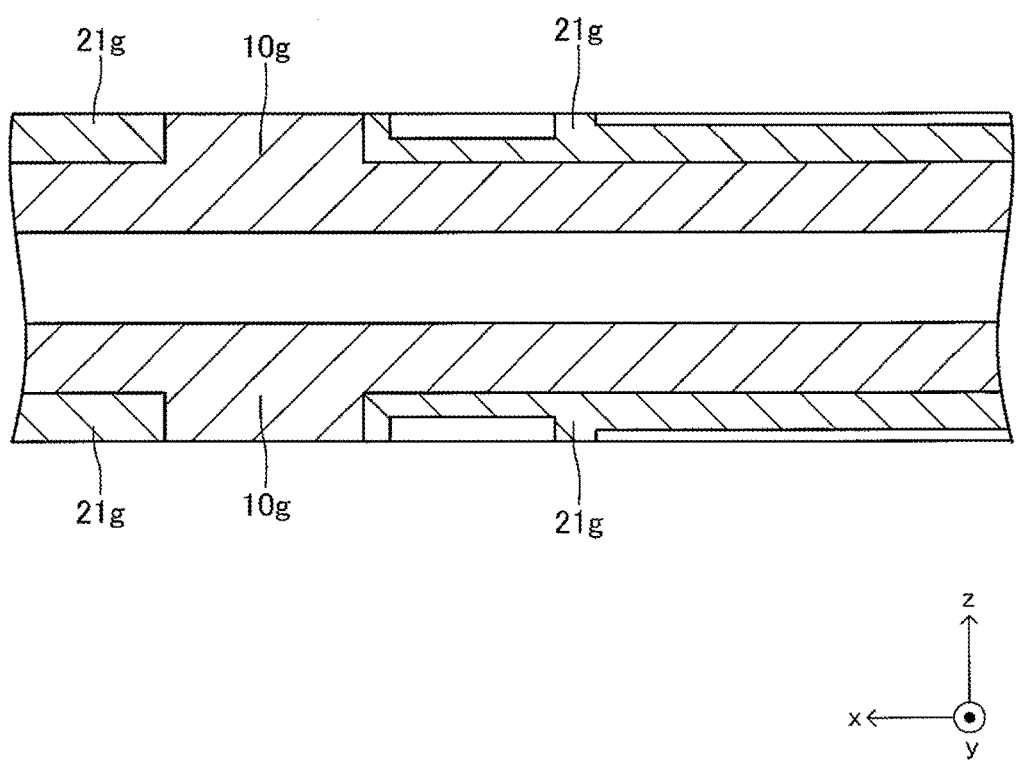
FIG. 19 is a sectional view corresponding to FIG. 13 in a second stage of the production process for the cell illustrated in FIG. 12.
Figure 20:
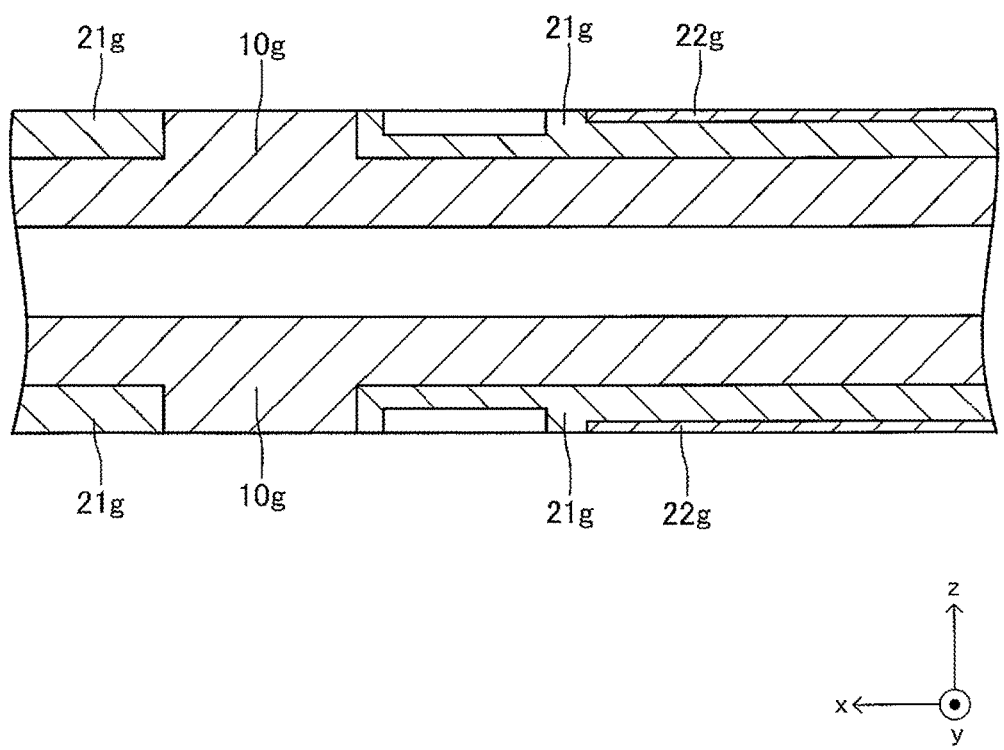
FIG. 20 is a sectional view corresponding to FIG. 13 in a third stage of the production process for the cell illustrated in FIG. 12.

After the support substrate compact 10g is produced as illustrated in FIG. 18, as illustrated in FIG. 19, a fuel-electrode current-collecting portion compact 21g is buried and formed in each concave portion formed on upper and lower surfaces of the support substrate compact 10g. Then, as illustrated in FIG. 20, a fuel-electrode active portion compact 22g is buried and formed in each concave portion formed on an outer surface of each fuel-electrode current-collecting portion compact 21g. Each fuel-electrode current-collecting portion compact 21g and each fuel-electrode active portion compact 22g are buried and formed, for example, by printing or the like through use of slurry obtained by adding a binder or the like to powder of a material (for example, Ni and YSZ) of the fuel electrode 20.

Figure 21:
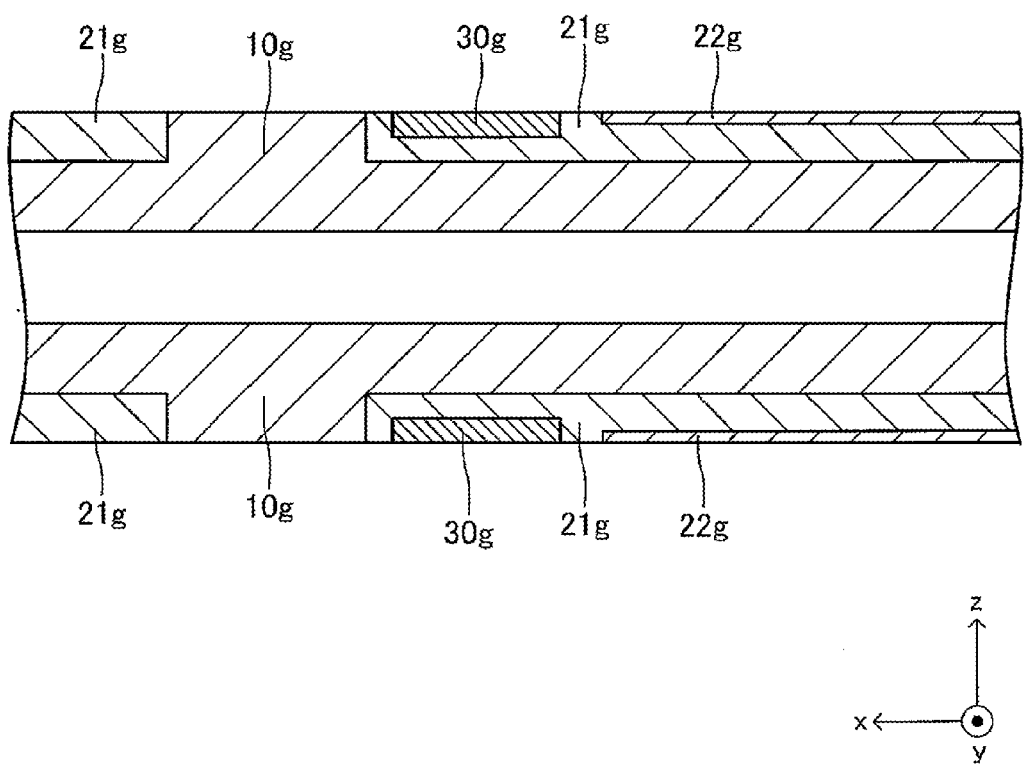
FIG. 21 is a sectional view corresponding to FIG. 13 in a fourth stage of the production process for the cell illustrated in FIG. 12.

Then, as illustrated in FIG. 21, an interconnector compact 30g is buried and formed in each concave portion formed in the "portion excluding the portion where the fuel-electrode active portion compact 22g is buried" in the outer surface of each fuel-electrode current-collecting portion compact 21g. Each interconnector compact 30g is buried and formed, for example, by printing or the like through use of slurry obtained by adding a binder or the like to powder of a material (for example, LaCrO$_3$) of the interconnector 30.

Figure 22:
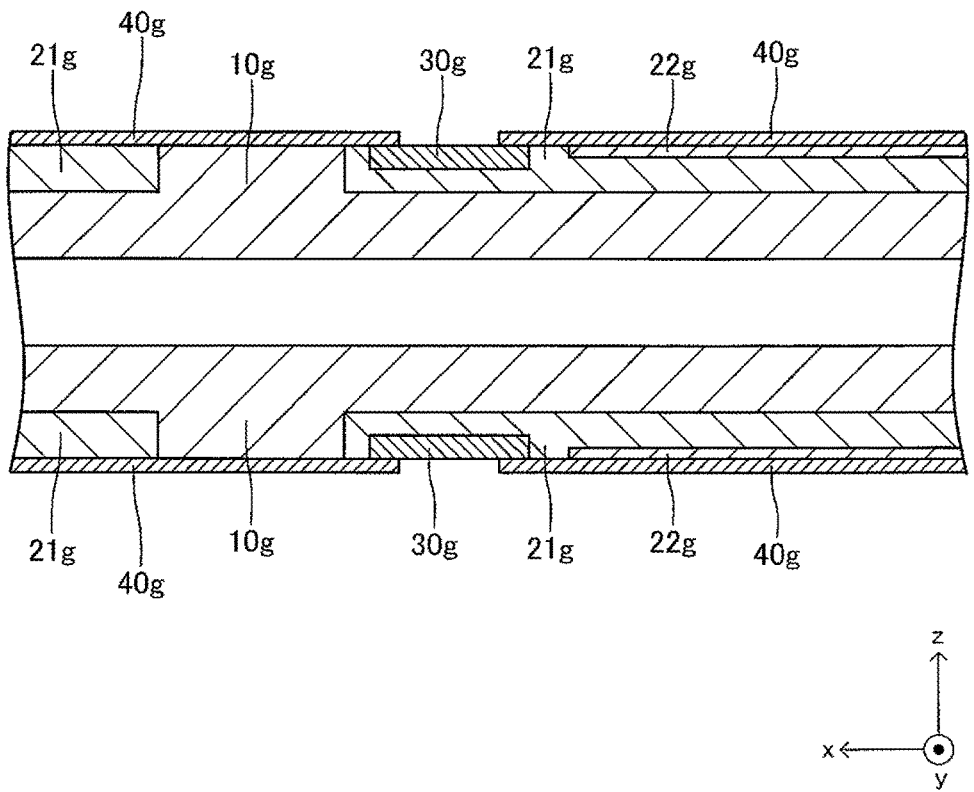
FIG. 22 is a sectional view corresponding to FIG. 13 in a fifth stage of the production process for the cell illustrated in FIG. 12.

Next, as illustrated in FIG. 22, a solid electrolyte film compact 40g is formed on the entire outer peripheral surface extending in the longitudinal direction in the support substrate compact 10g in a state in which a plurality of fuel electrode compacts (21g and 22g) and a plurality of interconnector compacts 30g are respectively buried and formed excluding longitudinal center portions of the respective portions in which the plurality of interconnector compacts 30g are formed. The solid electrolyte film compact 40g is formed, for example, by printing, dipping, or the like through use of slurry obtained by adding a binder or the like to powder of a material (for example, YSZ) of the solid electrolyte film 40.

Figure 23:
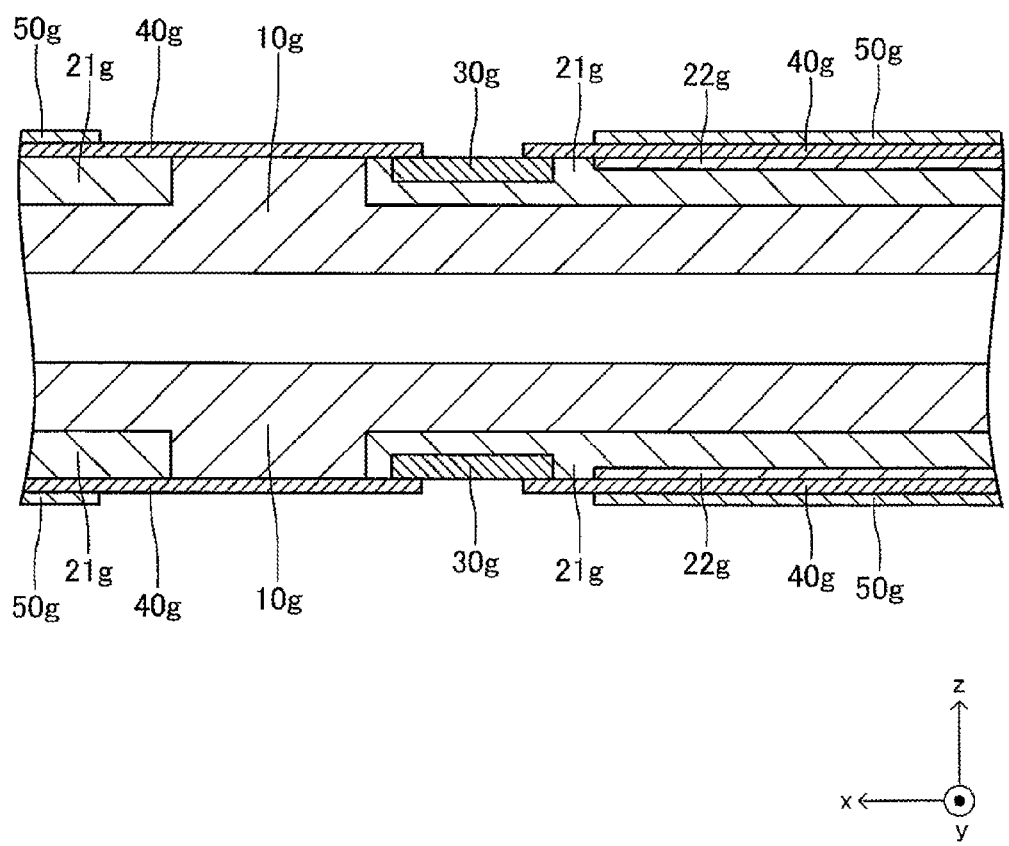
FIG. 23 is a sectional view corresponding to FIG. 13 in a sixth stage of the production process for the cell illustrated in FIG. 12.

Next, as illustrated in FIG. 23, a reaction preventing film compact 50g is formed on an outer surface of the solid electrolyte film compact 40g at a position provided in contact with each fuel electrode compact 22g. Each reaction preventing film compact 50g is formed, for example, by printing or the like through use of slurry obtained by adding a binder or the like to powder of a material (for example, GDC) of the reaction preventing film 50.

Then, the support substrate compact 10g in a state in which various compacts are formed thereon as described above is fired in the air at 1,500° C. for 3 hours. As a result, a structure in a state in which the air electrode 60 and the air-electrode current-collecting film 70 are not formed in the cell 100 illustrated in FIG. 12 is obtained.

Figure 24:
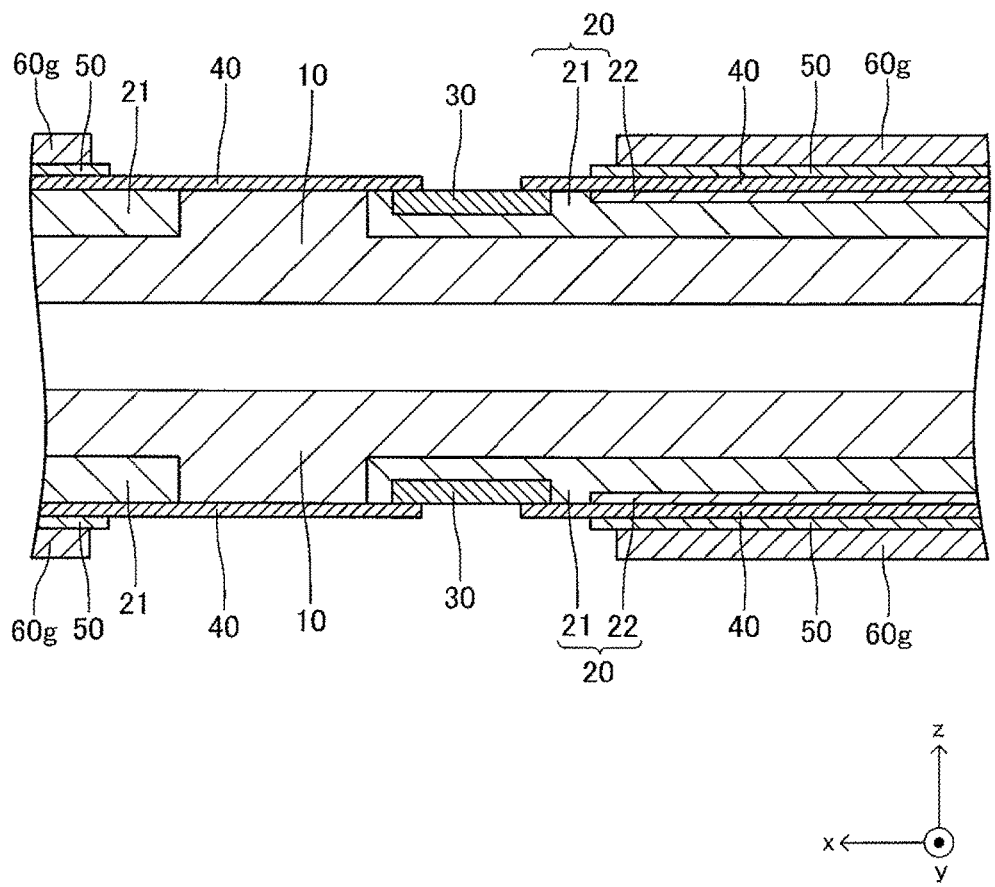
FIG. 24 is a sectional view corresponding to FIG. 13 in a seventh stage of the production process for the cell illustrated in FIG. 12.

Next, as illustrated in FIG. 24, an air electrode compact 60g is formed on an outer surface of each reaction preventing film 50. Each air electrode compact 60g is formed, for example, by printing or the like through use of slurry obtained by adding a binder or the like to powder of a material (for example, LSCF) of the air electrode 60.

Figure 25:
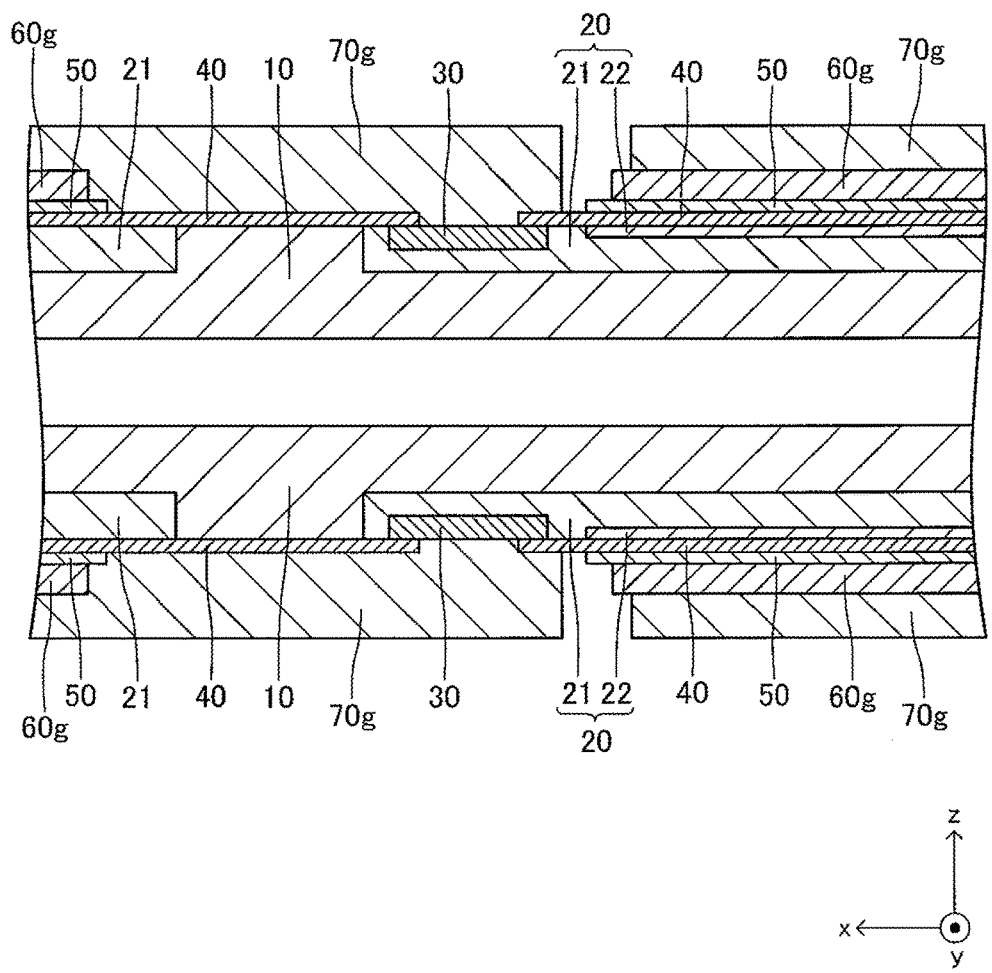
FIG. 25 is a sectional view corresponding to FIG. 13 in an eighth stage of the production process for the cell illustrated in FIG. 12.

Next, as illustrated in FIG. 25, in each set of the adjacent power generation element parts, an air-electrode current-collecting film compact 70g is formed on outer surfaces of the air electrode compact 60g, the solid electrolyte film 40, and the interconnector 30 so as to stride across the air electrode compact 60g in one power generation element part and the interconnector 30 in the other power generation element part. Each air-electrode current-collecting film compact 70g is formed, for example, by printing or the like through use of slurry obtained by adding a binder or the like to powder of a material (for example, LSCF) of the air-electrode current-collecting film 70.

Then, the support substrate 10 in a state in which the compacts 60g, 70g are formed is fired in the air at 1,050° C. for 3 hours. As a result, the cell 100 illustrated in of FIG. 12 is obtained. The example of the method of producing the cell 100 illustrated in FIG. 12 has been described.

(Function and Effects)

As described above, in the "horizontal-striped" cell 100 illustrated in FIG. 12, each of the plurality of concave portions 12 for burying the fuel electrode 20, which are formed on the upper and lower surfaces of the support substrate 10, has side walls closed in the circumferential direction, which are made of a material for the support substrate 10 around the entire periphery. In other words, a frame surrounding each concave portion 12 is formed in the support substrate 10. Thus, this structure is less likely to be deformed when the support substrate 10 receives an external force.

Further, under a state in which members such as the fuel electrodes 20 and the interconnectors 30 are filled and buried without any gap in the respective concave portions 12 of the support substrate 10, the support substrate 10 and the buried members are co-fired. Thus, a fired body having a high joining property between the members and high reliability is obtained.

Further, the interconnector 30 is buried in the concave portion 21*b* formed on the outer surface of the fuel-electrode current-collecting portion 21, and as a result, the two side surfaces in the width direction (y-axis direction) and the bottom surface of the interconnector 30 in a rectangular solid shape are provided in contact with the fuel-electrode current-collecting portion 21 in the concave portion 21*b*. Thus, compared with the case of adopting a configuration in which the interconnector 30 in a rectangular solid shape is laminated on (is provided in contact with) an outside plane of the fuel-electrode current-collecting portion 21, an area of an interface between the fuel electrode 20 (current-collecting portion 21) and the interconnector 30 can be enlarged. This can enhance electron conductivity between the fuel electrode 20 and the interconnector 30, with the result that power generation output of the fuel cell can be enhanced.

Further, in the cell 100 illustrated in FIG. 12, the plurality of power generation element parts A are provided on the respective upper and lower surfaces of the plate-like support substrate 10. Thus, compared with the case where the plurality of power generation element parts are provided only on one surface of the support substrate 10, the number of the power generation element parts in the structure can be increased, and power generation output of the fuel cell can be enhanced.

Further, in the cell 100 illustrated in FIG. 12, the solid electrolyte film 40 covers the outer surface of the fuel electrode 20, both longitudinal side end portions of the outer surface of the interconnector 30, and the principal surface of the support substrate 10. In this case, there is no step difference among the outer surface of the fuel electrode 20, the outer surface of the interconnector 30, and the principal surface of the support substrate 10. Thus, the solid electrolyte film 40 is flattened. As a result, compared with the case where there is a step difference in the solid electrolyte film 40, the generation of cracks in the solid electrolyte film 40 caused by the concentration of stress can be suppressed, and degradation in a gas sealing function of the solid electrolyte film 40 can be suppressed.

Note that, in the cell 100 illustrated in FIG. 12, as illustrated in FIG. 17 and the like, a planar shape (shape when viewed from a direction perpendicular to the principal surface of the support substrate 10) of the concave portion 12 formed in the support substrate 10 is a rectangle. However, the planar shape may be a square, a circle, an oval, an elongated hole, or the like.

Further, in the cell 100 illustrated in FIG. 12, although the entire interconnector 30 is buried in each concave portion 12, only a part of the interconnector 30 may be buried in each concave portion 12 and the remaining portion of the interconnector 30 may protrude outside the concave portion 12 (that is, protrude from the principal surface of the support substrate 10).

Figure 26:
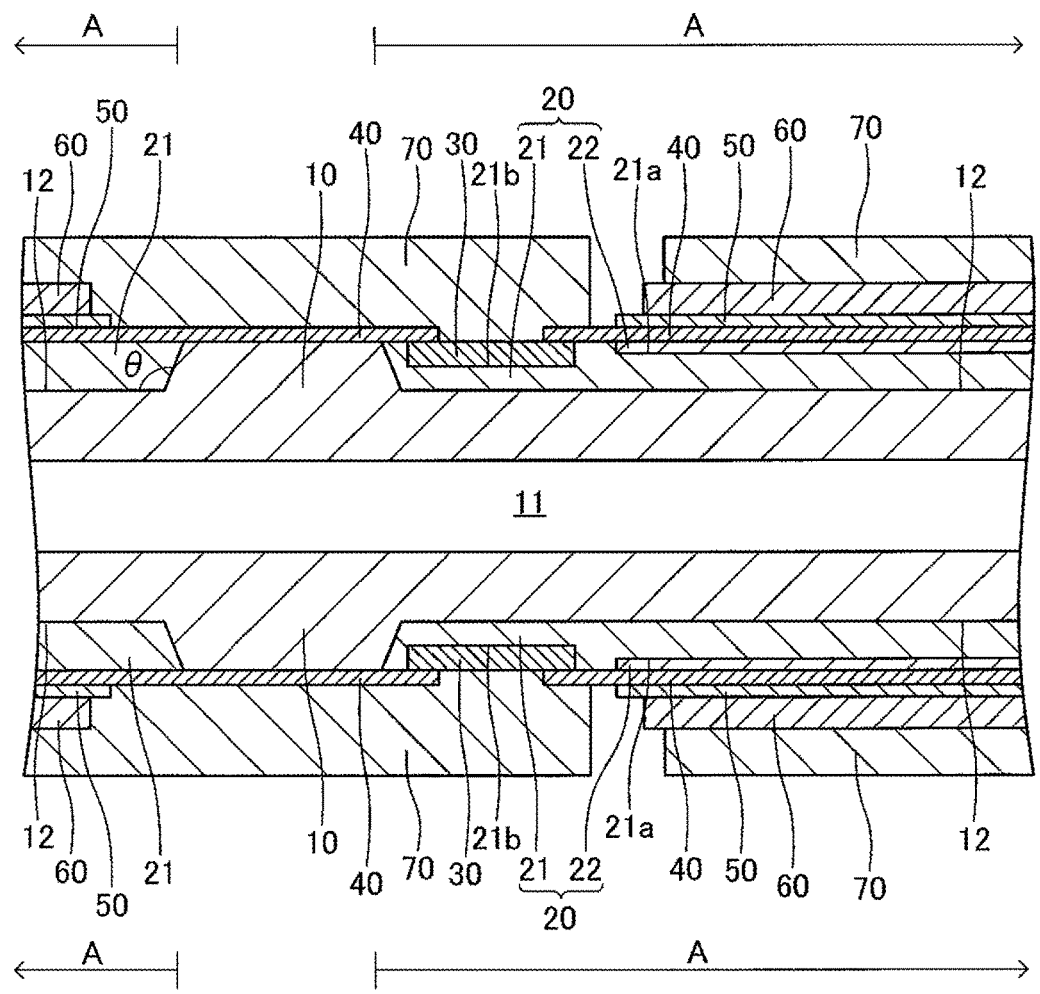
FIG. 26 is a sectional view corresponding to FIG. 13 of a first modified example of the cell illustrated in FIG. 12.
Figure 27:
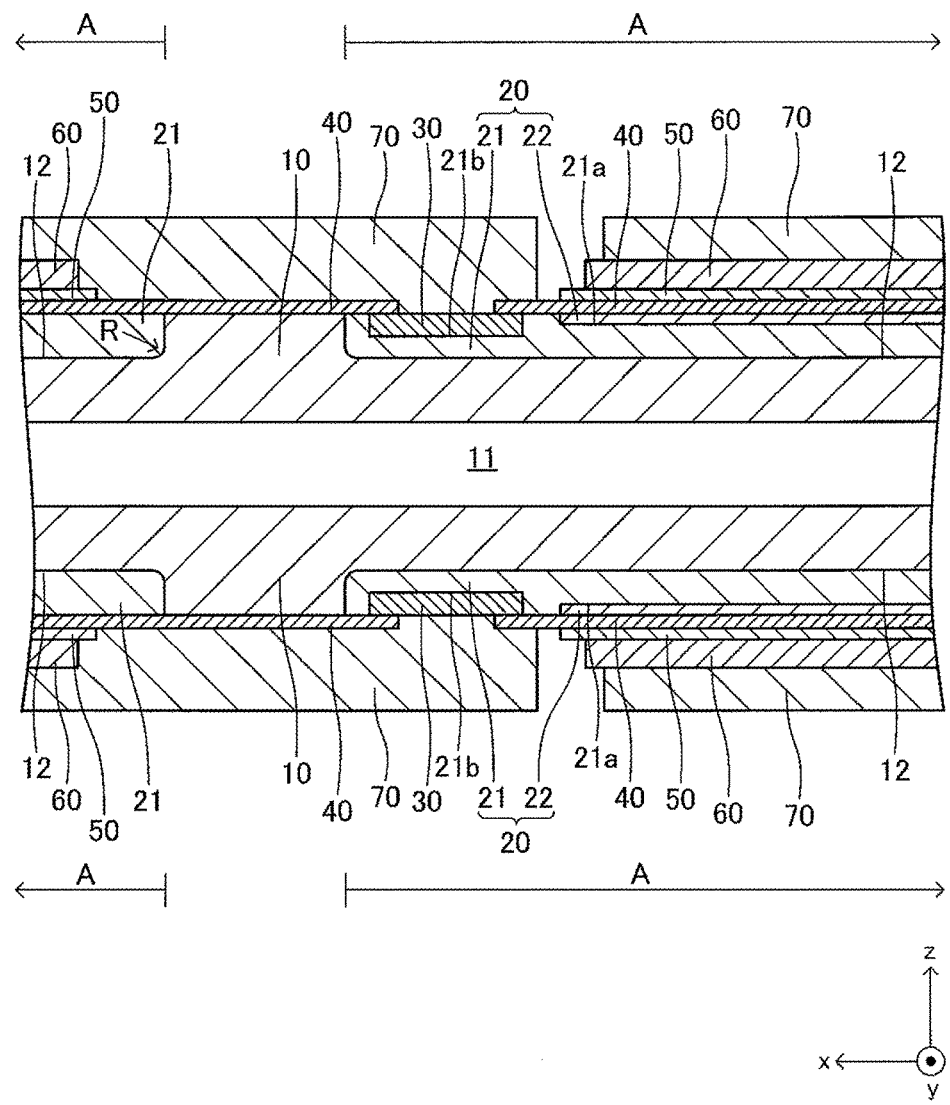
FIG. 27 is a sectional view corresponding to FIG. 13 of a second modified example of the cell illustrated in FIG. 12.

Further, in the cell 100 illustrated in FIG. 12, although an angle θ formed between the bottom wall and the side wall of the concave portion 12 is 90°, as illustrated in FIG. 26, the angle θ may be set to 90° to 135°. Further, in the cell 100 illustrated in FIG. 12, as illustrated in FIG. 27, a portion where the bottom wall and the side wall of the concave portion 12 intersect each other may have an arc shape with a radius R, and a ratio of the radius R with respect to the depth of the concave portion 12 may be 0.01 to 1.

Figure 28:
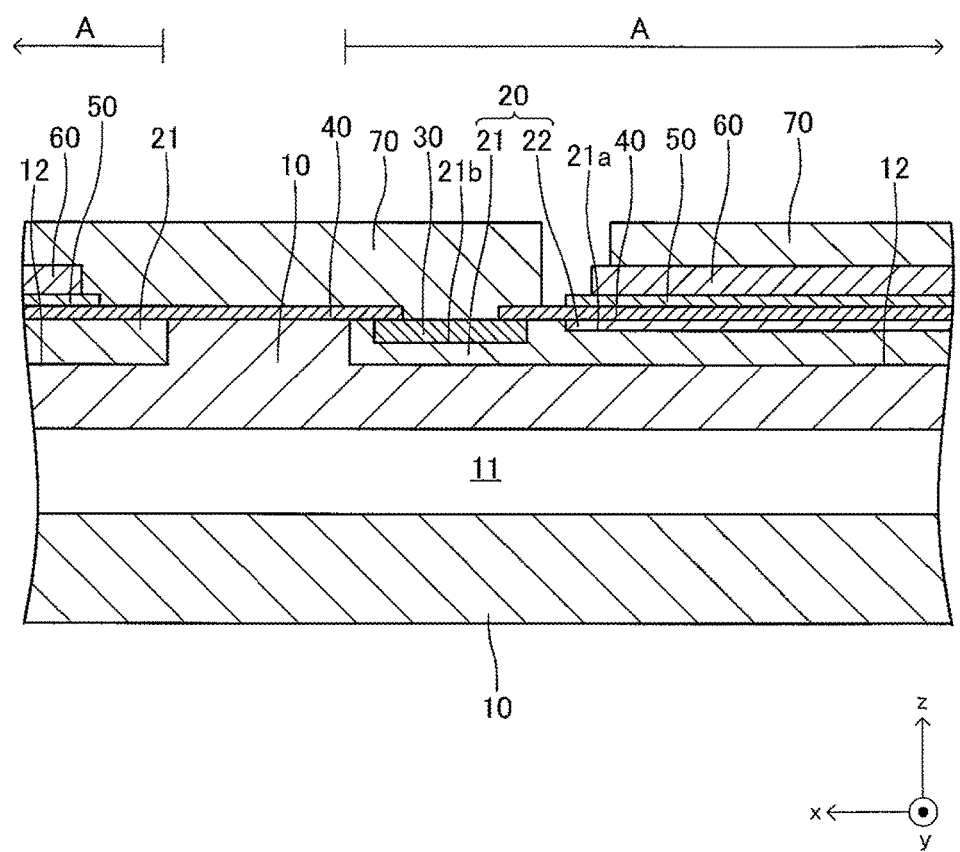
FIG. 28 is a sectional view corresponding to FIG. 13 of a third modified example of the cell illustrated in FIG. 12.

Further, in the cell 100 illustrated in FIG. 12, although the plurality of concave portions 12 are formed and the plurality of power generation element parts A are provided respectively on the upper and lower surfaces of the plate-like support substrate 10, the plurality of concave portions 12 may be formed and the plurality of power generation element parts A may be provided only on one surface of the support substrate 10, as illustrated in FIG. 28.

Further, in the cell 100 illustrated in FIG. 12, although the fuel electrode 20 is formed of two layers of the fuel-electrode current-collecting portion 21 and the fuel-electrode active portion 22, the fuel electrode 20 may be formed of one layer corresponding to the fuel-electrode active portion 22. In addition, in the cell 100 illustrated in FIG. 12, although an "inside electrode" and an "outside electrode" respectively serve as the fuel electrode and the air electrode, the "inside electrode" and the "outside electrode" may respectively serve as the air electrode and the fuel electrode.

In addition, in the cell 100 illustrated in FIG. 12, as illustrated in FIG. 14, the concave portion 21*b* formed on the outer surface of the fuel-electrode current-collecting portion 21 is a recess formed into a rectangular solid shape, which is defined by the bottom wall made of the material for the fuel-electrode current-collecting portion 21 and the side walls (two side walls in the longitudinal direction made of the material for the support substrate 10 and two side walls in the width direction made of the material for the fuel-electrode current-collecting portion 21) closed in the circumferential direction. As a result, the two side surfaces in the width direction and the bottom surface of the interconnector 30 buried in the concave portion 21*b* are provided in contact with the fuel-electrode current-collecting portion 21 in the concave portion 21*b*.

Figure 29:
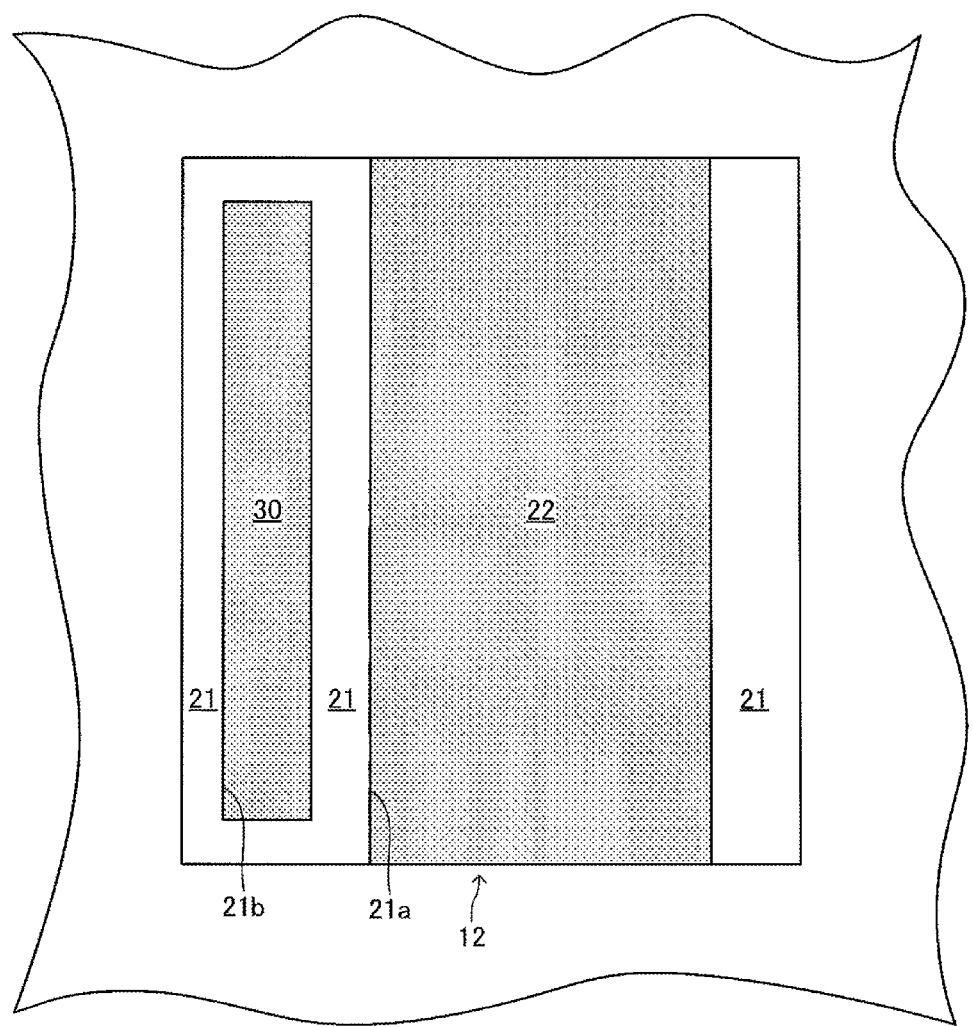
FIG. 29 is a sectional view corresponding to FIG. 14 of a fourth modified example of the cell illustrated in FIG. 12.
Figure 30:
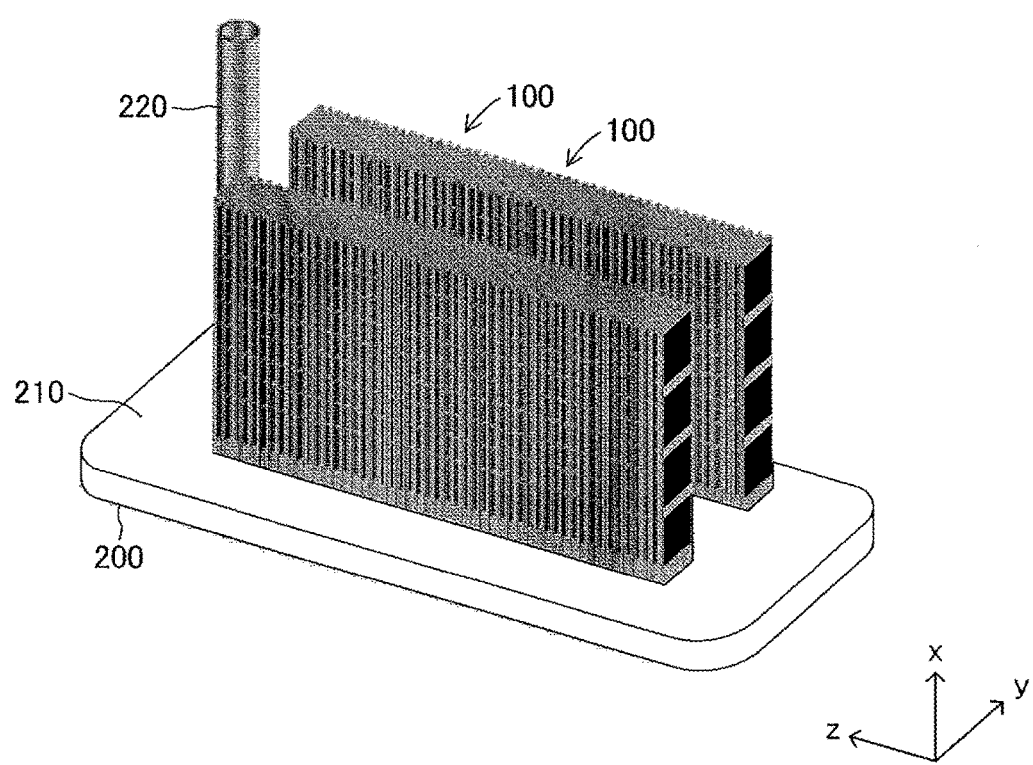
FIG. 30 is a view corresponding to FIG. 2 in the case where the cell illustrated in FIG. 12 is used in the stack structure of the fuel cell according to the embodiment of the present invention.
Figure 31:
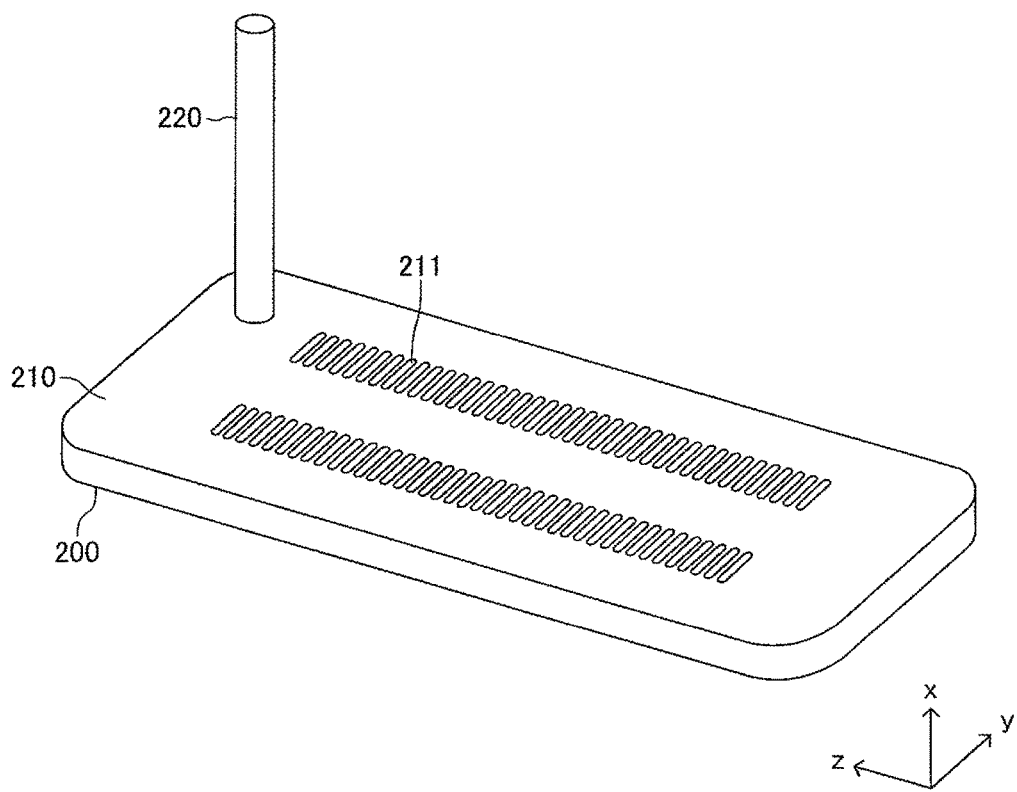
FIG. 31 is a view corresponding to FIG. 3 in the case where the cell illustrated in FIG. 12 is used in the stack structure of the fuel cell according to the embodiment of the present invention.
Figure 32:
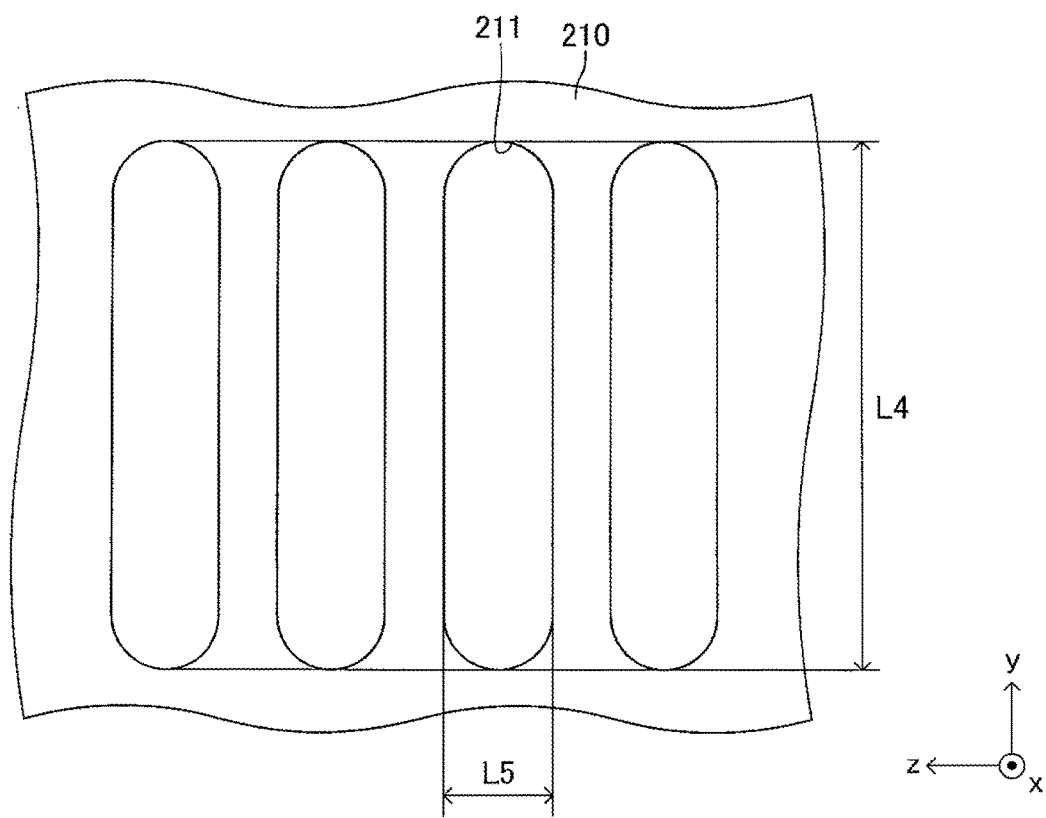
FIG. 32 is a view corresponding to FIG. 4 in the case where the cell illustrated in FIG. 12 is used in the stack structure of the fuel cell according to the embodiment of the present invention.

In contrast, as illustrated in FIG. 29, the concave portion 21*b* formed on the outer surface of the fuel-electrode current-collecting portion 21 may be a recess formed into a rectangular solid shape, which is defined by the bottom wall made of the material for the fuel-electrode current-collecting portion 21 and the side walls (two side walls in the longitudinal direction and two side walls in the width direction) closed in the circumferential direction, which are made of the material for the fuel-electrode current-collecting portion 21 around the entire periphery. According to this, all the four side surfaces and the bottom surface of the interconnector 30 buried in the concave portion 21*b* are provided in contact with the fuel-electrode current-collecting portion 21 in the concave portion 21*b*. Thus, an area of an interface between the fuel-electrode current-collecting portion 21 and the interconnector 30 can be further enlarged. This can further enhance electron conductivity between the fuel-electrode current-collecting portion 21 and the interconnector 30, with the result that power generation output of the fuel cell can be further enhanced.

Figure 33:
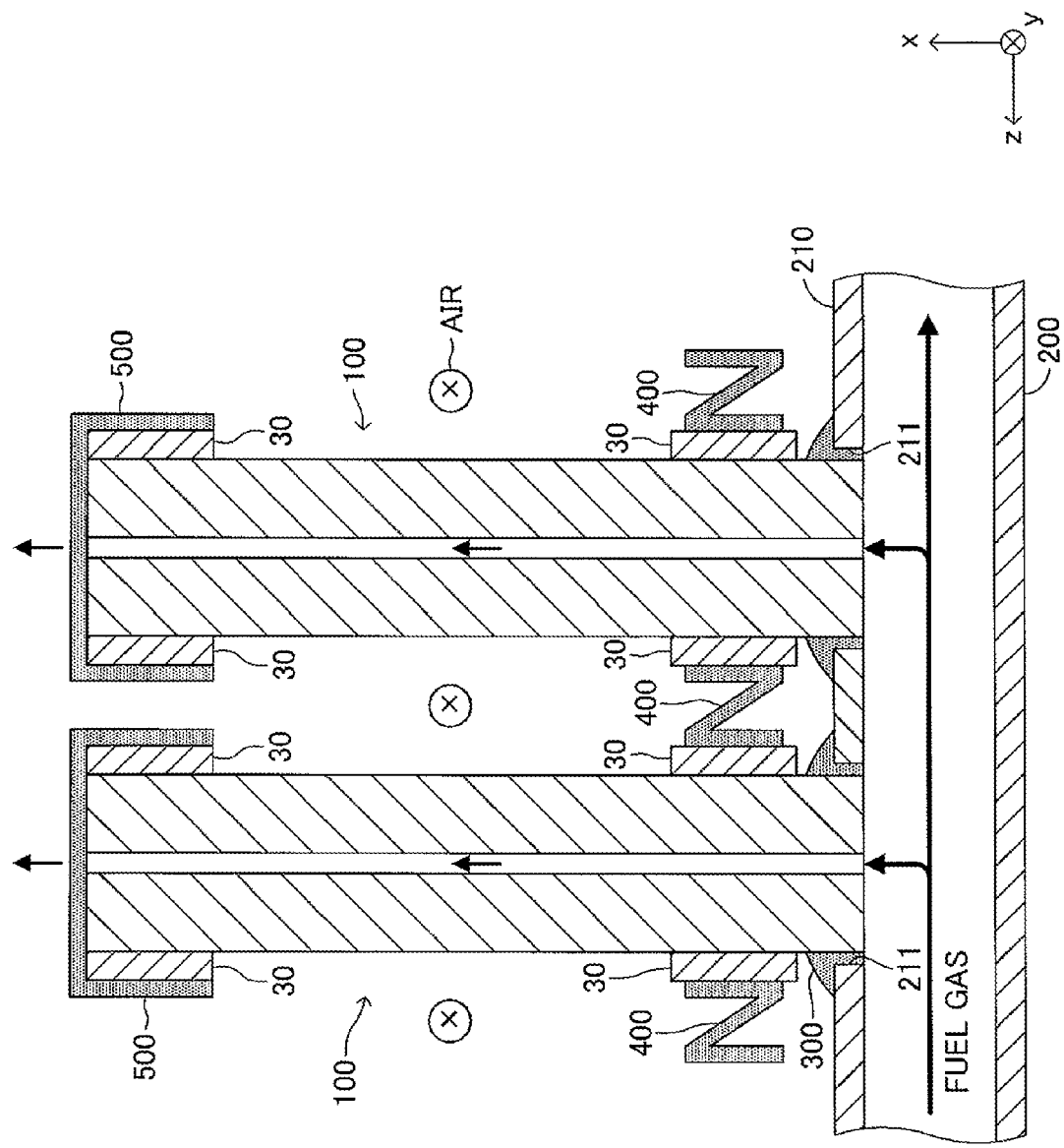
FIG. 33 is a view corresponding to FIG. 5 in the case where the cell illustrated in FIG. 12 is used in the stack structure of the fuel cell according to the embodiment of the present invention.
Figure 34:
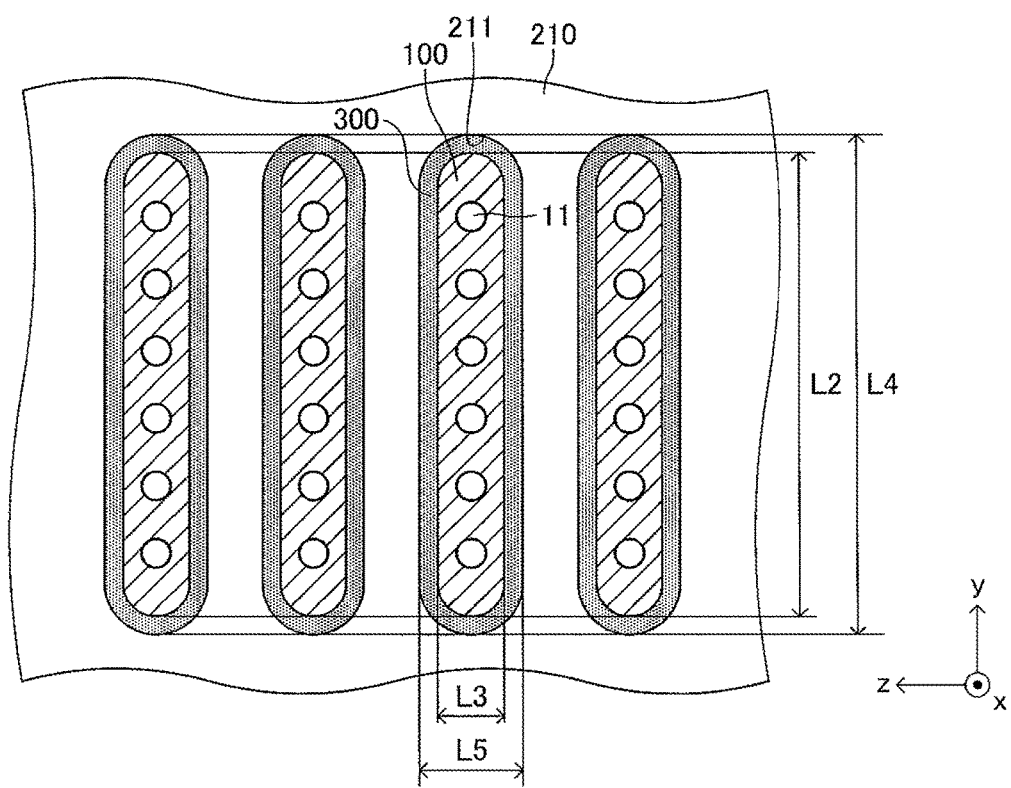
FIG. 34 is a view corresponding to FIG. 6 in the case where the cell illustrated in FIG. 12 is used in the stack structure of the fuel cell according to the embodiment of the present invention.
Figure 35:
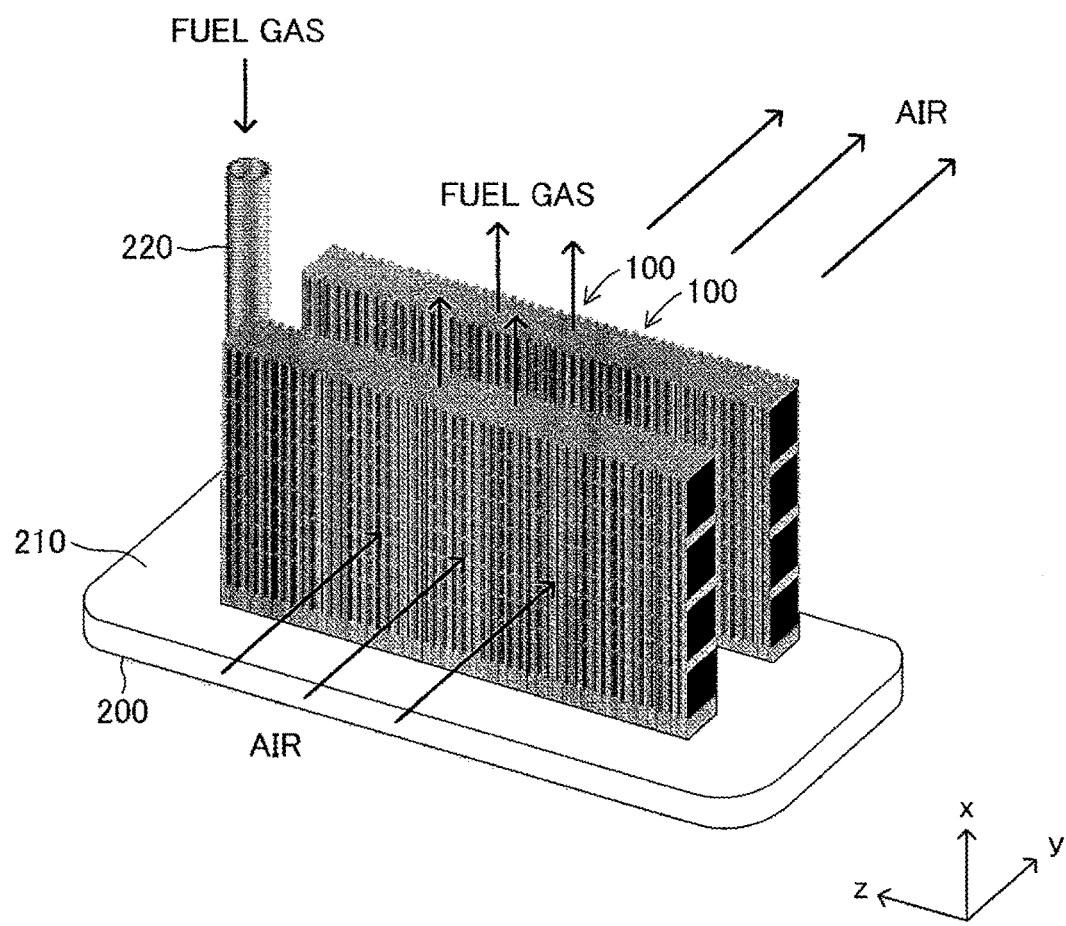
FIG. 35 is a view corresponding to FIG. 7 in the case where the cell illustrated in FIG. 12 is used in the stack structure of the fuel cell according to the embodiment of the present invention.

FIGS. 30 to 35 respectively correspond to FIGS. 2 to 7 in the case where the cell illustrated in FIG. 12 is used in the stack structure of the fuel cell according to the embodiment of the present invention. In FIGS. 30 to 35, the members and configurations which are the same as or equivalent to those illustrated in FIGS. 2 to 7 are denoted with the same reference symbols as those used in FIGS. 2 to 7. As illustrated in FIG. 33, in this case, the cells 100, 100 adjacent to each other are electrically connected in series to each other, and hence, a current-collecting member 500 for electrically connecting a front side to a back side of each cell 100 in series may be provided in addition to a current-collecting member 400 corresponding to the current-collecting member 400 illustrated in FIG. 5.

What is claimed is:

1. A joining material, which is formed of crystallized glass having a crystallinity degree of 60% or more,
   wherein a volume reduction ratio of the joining material caused by crystallization at a crystallization temperature is 0.78% or more and 12% or less, and
   wherein a density ratio which is a ratio of the density of a crystal phase included in the joining material to the density of an amorphous phase included in the joining material is 1.01 or more and 1.05 or less.

2. A joining material according to claim 1, wherein the crystallized glass comprises a plurality of kinds of crystal phases.

3. A joining material according to claim 1, wherein the crystallized glass is formed of a $SiO_2$—MgO based material.

4. A joining material according to claim 1,
   wherein, wherein the crystallized glass is generated when an amorphous glass is heated up to a crystallization temperature by heat treatment and wherein the following volumes are obtained:
   a first volume which is a volume of the material in an amorphous state at a time point when the temperature of the material reaches a glass transition point;
   a second volume which is a volume of the material in an amorphous state at a time point when the temperature of the material reaches one of a predetermined temperature between the glass transition point and a glass softening point higher than the glass transition point, and the glass softening point; and
   a third volume which is a volume of the material after the crystallization at a time point when the crystallization of the material is determined to have been completed at the crystallization temperature higher than the glass softening point after the temperature of the material reaches the crystallization temperature,
   wherein a fourth volume which is a volume of the material in an amorphous state at a time point before the temperature of the material reaches the crystallization temperature and the crystallization of the material is started is estimated based on the obtained first volume and the obtained second volume, the glass transition point, one of the predetermined temperature and the glass softening point, and the crystallization temperature, and
   wherein a value calculated through use of the third volume and the fourth volume is used as the volume reduction ratio of the joining material caused by the crystallization at the crystallization temperature.

5. A stack structure of a fuel cell, comprising:
   a plurality of cells each comprising a support substrate having a longitudinal direction and including a gas flow path formed therein in the longitudinal direction, and a power generation element part which is provided on a surface of the support substrate and which includes at least an inside electrode, a solid electrolyte, and an outside electrode laminated in the stated order;
   a support plate for joining and supporting one end of each of the plurality of cells in the longitudinal direction through use of a joining material so that the each of the plurality of cells protrudes from a surface of the support plate in the longitudinal direction and the plurality of cells are arranged in a stack shape; and
   a gas manifold having the support plate provided thereon so that an inner space of the gas manifold communicates with one end of the gas flow path of the each of the plurality of cells,
   wherein the support plate includes, in the surface thereof, at least one hole formed so as to cause the inner space of the gas manifold to communicate with the one end of the each of the plurality of cells,
   wherein the one end of the each of the plurality of cells is positioned with respect to corresponding one of the at least one hole,
   wherein the joining material is provided so as to fill a space present between the at least one hole and the one end of the each of the plurality of cells in each joining portion between the at least one hole and the one end of corresponding one of the plurality of cells so that the at least one hole is joined to the one end of the corresponding one of the plurality of cells, and
   wherein the joining material according to claim 1 is used as the joining material.

6. A stack structure of a fuel cell, comprising:
   a plurality of cells each comprising a support substrate having a longitudinal direction and including a gas flow path formed therein in the longitudinal direction, and a power generation element part which is provided on a surface of the support substrate and which includes at least an inside electrode, a solid electrolyte, and an outside electrode laminated in the stated order;
   a support plate for joining and supporting one end of each of the plurality of cells in the longitudinal direction through use of a joining material so that the each of the plurality of cells protrudes from a surface of the support plate in the longitudinal direction and the plurality of cells are arranged in a stack shape; and
   a gas manifold having the support plate provided thereon so that an inner space of the gas manifold communicates with one end of the gas flow path of the each of the plurality of cells,
   wherein the support plate includes, in the surface thereof, a plurality of insertion holes which communicate with the inner space of the gas manifold and are formed so as to insert the one end of the each of the plurality of cells therein,
   wherein the one end of the each of the plurality of cells is loosely fitted in corresponding one of the plurality of insertion holes,
   wherein the joining material is provided so as to enter at least a gap present between an inner wall of each of the plurality of insertion holes and an outer wall of the one end of the each of the plurality of cells in each joining portion between the each of the plurality of insertion holes and the one end of corresponding one of the plurality of cells so that the each of the plurality of insertion holes is joined to the one end of the corresponding one of the plurality of cells, and
   wherein the joining material according to claim 1 is used as the joining material.

7. A stack structure of a fuel cell according to claim 5,
   wherein the support substrate comprises a porous plate-like support substrate including the gas flow path formed therein,
   wherein the power generation element part comprises a plurality of power generation element parts which are respectively provided in a plurality of portions away from each other on a principal surface of the porous plate-like support substrate, the plurality of power generation element parts each including at least the inside electrode, the solid electrolyte, and the outside electrode laminated in the stated order, wherein the each of the plurality of cells further comprises at least one electrical connecting part provided between at least one set of adjacent two of the plurality of power generation element parts, the at least one electrical connecting part electrically connecting the inside electrode of one of the adjacent two of the plurality of power generation element parts to the outside electrode of another of the adjacent two of the plurality of power generation element parts, wherein concave portions each having a bottom wall and a side wall closed in a circumferential direction are formed respectively in the plurality of portions on the principal surface of the porous plate-like support substrate, and wherein the inside electrode of corresponding one of the plurality of power generation element parts is buried in each of the concave portions.

8. A stack structure of a fuel cell according to claim 5, wherein the support substrate comprises a porous plate-like support substrate including the gas flow path formed therein, wherein the power generation element part comprises a plurality of power generation element parts which are respectively provided in a plurality of portions away from each other on a principal surface of the porous plate-like support substrate, the plurality of power generation element parts each including at least the inside electrode, the solid electrolyte, and the outside electrode laminated in the stated order, wherein the each of the plurality of cells further comprises at least one electrical connecting part provided between at least one set of adjacent two of the plurality of power generation element parts, the at least one electrical connecting part electrically connecting the inside electrode of one of the adjacent two of the plurality of power generation element parts to the outside electrode of another of the adjacent two of the plurality of power generation element parts, wherein the at least one electrical connecting part includes a first portion formed of a dense material and a second portion connected to the first portion and formed of a porous material, wherein first concave portions each having a bottom wall made of a material for the porous plate-like support substrate and a side wall closed in a circumferential direction and made of the material for the porous plate-like support substrate around an entire periphery are formed respectively in the plurality of portions on the principal surface of the porous plate-like support substrate, wherein the inside electrode of corresponding one of plurality of power generation element parts is buried in each of the first concave portions, wherein second concave portions each having a bottom wall made of a material for the inside electrode and a side wall closed in the circumferential direction and made of the material for the inside electrode around an entire periphery are respectively formed on outside surfaces of the respective buried inside electrodes, and wherein the first portion of corresponding one of the at least one electrical connecting part is buried in each of the second concave portions.

9. A stack structure of a fuel cell according to claim 6, wherein the support substrate comprises a porous plate-like support substrate including the gas flow path formed therein, wherein the power generation element part comprises a plurality of power generation element parts which are respectively provided in a plurality of portions away from each other on a principal surface of the porous plate-like support substrate, the plurality of power generation element parts each including at least the inside electrode, the solid electrolyte, and the outside electrode laminated in the stated order, wherein the each of the plurality of cells further comprises at least one electrical connecting part provided between at least one set of adjacent two of the plurality of power generation element parts, the at least one electrical connecting part electrically connecting the inside electrode of one of the adjacent two of the plurality of power generation element parts to the outside electrode of another of the adjacent two of the plurality of power generation element parts, wherein concave portions each having a bottom wall and a side wall closed in a circumferential direction are formed respectively in the plurality of portions on the principal surface of the porous plate-like support substrate, and wherein the inside electrode of corresponding one of the plurality of power generation element parts is buried in each of the concave portions.

10. A stack structure of a fuel cell according to claim 6, wherein the support substrate comprises a porous plate-like support substrate including the gas flow path formed therein, wherein the power generation element part comprises a plurality of power generation element parts which are respectively provided in a plurality of portions away from each other on a principal surface of the porous plate-like support substrate, the plurality of power generation element parts each including at least the inside electrode, the solid electrolyte, and the outside electrode laminated in the stated order, wherein the each of the plurality of cells further comprises at least one electrical connecting part provided between at least one set of adjacent two of the plurality of power generation element parts, the at least one electrical connecting part electrically connecting the inside electrode of one of the adjacent two of the plurality of power generation element parts to the outside electrode of another of the adjacent two of the plurality of power generation element parts, wherein the at least one electrical connecting part includes a first portion formed of a dense material and a second portion connected to the first portion and formed of a porous material, wherein first concave portions each having a bottom wall made of a material for the porous plate-like support substrate and a side wall closed in a circumferential direction and made of the material for the porous plate-like support substrate around an entire periphery are formed respectively in the plurality of portions on the principal surface of the porous plate-like support substrate, wherein the inside electrode of corresponding one of plurality of power generation element parts is buried in each of the first concave portions, wherein second concave portions each having a bottom wall made of a material for the inside electrode and a side wall closed in the circumferential direction and made of the material for the inside electrode around an entire periphery are respectively formed on outside surfaces of the respective buried inside electrodes, and wherein the first portion of corresponding one of the at least one electrical connecting part is buried in each of the second concave portions.

* * * * *